(12) United States Patent
Biage et al.

(10) Patent No.: US 9,426,304 B2
(45) Date of Patent: *Aug. 23, 2016

(54) ANSWERING OR RELEASING EMERGENCY CALLS FROM A MAP DISPLAY FOR AN EMERGENCY SERVICES PLATFORM

(71) Applicant: Solacom Technologies Inc., Gatineau (CA)

(72) Inventors: Daniel Biage, Gatineau (CA); Gilles Ferland, Kingston (CA)

(73) Assignee: Solacom Technologies Inc. (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/556,852

(22) Filed: Dec. 1, 2014

(65) Prior Publication Data

US 2015/0085997 A1 Mar. 26, 2015

Related U.S. Application Data

(63) Continuation-in-part of application No. 13/627,417, filed on Sep. 26, 2012, now Pat. No. 8,903,355.

(60) Provisional application No. 61/539,455, filed on Sep. 26, 2011.

(51) Int. Cl.
| | |
|---|---|
| *H04M 11/04* | (2006.01) |
| *H04W 4/22* | (2009.01) |
| *H04M 3/54* | (2006.01) |
| *H04M 3/00* | (2006.01) |
| *H04M 3/51* | (2006.01) |
| *H04W 4/02* | (2009.01) |
| *H04W 76/00* | (2009.01) |
| *H04W 76/02* | (2009.01) |
| *H04L 29/08* | (2006.01) |
| *H04W 4/18* | (2009.01) |

(52) U.S. Cl.
CPC ............ *H04M 11/04* (2013.01); *H04M 3/00* (2013.01); *H04M 3/5116* (2013.01); *H04M 3/541* (2013.01); *H04W 4/02* (2013.01); *H04W 4/22* (2013.01); *H04W 76/007* (2013.01); *H04L 67/18* (2013.01); *H04M 2242/04* (2013.01); *H04W 4/18* (2013.01); *H04W 76/021* (2013.01)

(58) Field of Classification Search
USPC ........................................ 379/37–45
See application file for complete search history.

(56) References Cited

U.S. PATENT DOCUMENTS

| | | | |
|---|---|---|---|
| 8,630,610 B2 | 1/2014 | Shaffer et al. | |
| 2007/0263610 A1* | 11/2007 | Mitchell | H04L 12/66 370/356 |
| 2008/0036586 A1* | 2/2008 | Ohki | 340/539.13 |
| 2009/0100165 A1* | 4/2009 | Wesley et al. | 709/223 |
| 2010/0166154 A1* | 7/2010 | Peters | H04M 3/5116 379/45 |
| 2010/0317317 A1* | 12/2010 | Maier | H04W 64/00 455/404.2 |

(Continued)

*Primary Examiner* — Maria El-Zoobi
(74) *Attorney, Agent, or Firm* — Stevens & Showalter LLP

(57) ABSTRACT

A method and system of emergency call management is provided. Emergency calls received at an emergency service platform (ESP) through one or more communication networks are associated with location information. The location information is identified to a map server through an i3 event logging protocol to be displayed on graphical map displays at operator positions. An operator of an operator position can then select a call from the graphical map display and an associated responder client will request that the emergency call be routed by the ESP to the operator or a secondary responder agency. The operator position are associated with a public safety access point (PSAP) associated with the incoming emergency calls.

26 Claims, 12 Drawing Sheets

(56) References Cited

U.S. PATENT DOCUMENTS

2012/0027189 A1* 2/2012 Shaffer ............ H04M 3/42068
379/142.1
2013/0005294 A1* 1/2013 Levinson ................. H04N 7/18
455/404.2
2014/0023064 A1 1/2014 Schulzrinne et al.
2014/0368601 A1* 12/2014 deCharms ................. 348/14.02

* cited by examiner

US 9,426,304 B2

ANSWERING OR RELEASING EMERGENCY CALLS FROM A MAP DISPLAY FOR AN EMERGENCY SERVICES PLATFORM

CROSS-REFERENCE TO RELATED APPLICATION

This application is a continuation-in-part of U.S. patent application Ser. No. 13/627,417 filed Sep. 26, 2012, which claims the benefit of U.S. Provisional Patent Application No. 61/539,455, filed Sep. 26, 2011, the disclosures of which are hereby incorporated by reference in their entirety for all purposes.

TECHNICAL FIELD

The present disclosure relates to emergency service platforms and in particular to call control integration with map display systems.

BACKGROUND

The National Emergency Number Association (NENA) had defined a protocol for the evolution of the North American 9-1-1 system, and is addressing the challenge with a system design called "Next Generation 9-1-1" or NG9-1-1 is the evolution of Enhanced 9-1-1 to an all-IP-based emergency communications system. This technical specification, commonly referred to as i3, is the first version of the NG9-1-1 system design to accommodate an increasing volume and diversity of information that can be made available to assist emergency services.

The i3 protocol references several types of originating networks that could be used to deliver calls to an public safety access point (PSAP) Emergency services Internet Protocol Network, including legacy circuit-switched networks (wireline or wireless). Networks that are not IP based that are coupled to the PSAP must undergo mediation via a gateway to convert the incoming signaling to session initiated protocol (SIP). In addition, functionality must be applied to legacy emergency calls to acquire location information and use the information obtained in call setup signaling to route a call to the public safety answering point. Mapping information has been traditional utilized to enable an operator to identify a location of a call once it has been assigned to the position. However traditional call assignment algorithms can be inefficient when an incident occurs that generate clusters of calls all related to the same event as emergency calls that are not related to the incident may not be responded to in a timely matter.

Accordingly, systems and methods that enable improved emergency call management remains highly desirable.

BRIEF DESCRIPTION OF THE DRAWINGS

Further features and advantages of the present disclosure will become apparent from the following detailed description, taken in combination with the appended drawings, in which.

DETAILED DESCRIPTION

Figure 1:
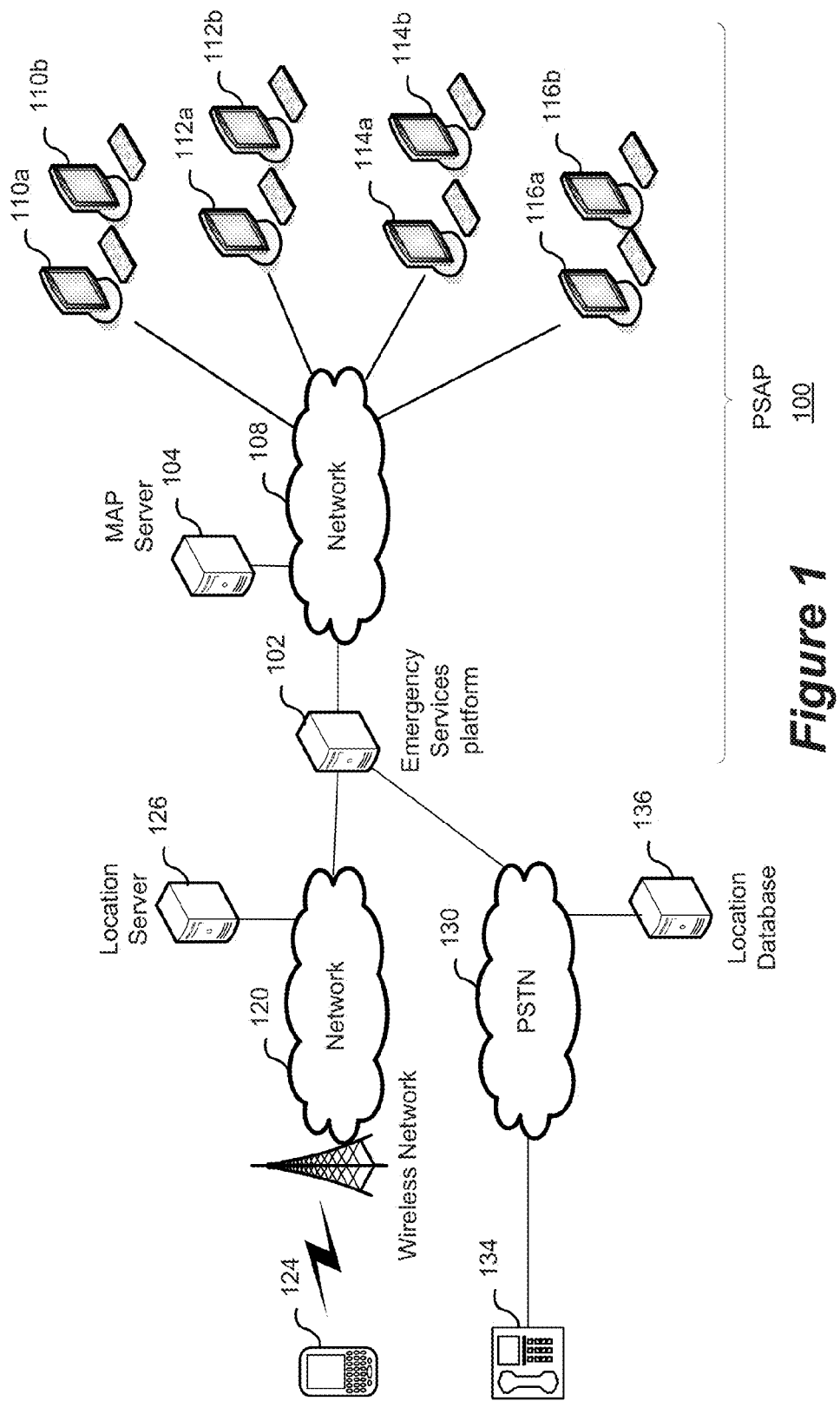
FIG. 1 is a system for answering or releasing emergency calls from a map for an emergency services platform.

In accordance with an aspect of the present disclosure there is provided a method of emergency call management, the method comprising: receiving an emergency call at an emergency service platform (ESP) providing an interface to one or more communications networks; receiving location information associated with the emergency call; identifying the location of the emergency call on a graphical map display; receiving a selection of the emergency call from a plurality of emergency calls displayed on the graphical map display; determining one or more secondary responder agencies for the selected emergency call; receiving a selection of a secondary responder agency from the one or more secondary responder agencies; and initiating a transfer of the selected emergency call to one of the one or more secondary responder agencies.

In accordance with another aspect of the present disclosure there is provided a system of emergency call management, the system comprising: an emergency service platform (ESP) interfacing to one or more communications networks for receiving emergency calls originating from the one or more communications networks; a map server for receiving location information from the ESP associated with the receive emergency calls; and a public safety access point (PSAP) coupled to the ESP and map server, the PSAP comprising one or more operator positions; each operator position comprising: a graphical map display for receiving mapping data from the map server and receiving a selection of an emergency call on the display; and a responder client coupled to the graphical map display for receiving identification of the selected emergency call and for requesting from the ESP that the emergency call be directed to one of the one or more secondary responder agencies.

In accordance with yet another aspect of the present disclosure there is provided A non-transitory computer readable memory containing instruction for emergency call management, the instructions when executed by a processor performing the method comprising: receiving an emergency call at an emergency service platform (ESP) providing an interface to one or more communication networks; receiving location information associated with the emergency call; identifying the location of the emergency call on a graphical map display; receiving a selection of the emergency call from a plurality of emergency calls displayed on the graphical map display; determining one or more secondary responder agencies for the selected emergency call; receiving a selection of a secondary responder agency from the one or more secondary responder agencies; and initiating a transfer of the selected emergency call to one of the one or more secondary responder agencies.

Although the following discloses example methods and apparatus including, among other components, software executed on hardware, it should be noted that such methods and apparatus are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the following describes example methods and apparatus, persons having ordinary skill in the art will readily appreciate that the examples provided are not the only way to implement such methods and apparatus.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the scope of the teachings provided herein is not considered to be limited to the specific description of the embodiments provided herein. Embodiments are described below, by way of example only, with reference to FIGS. 1 to 11.

FIG. 1 is a system for answering or releasing emergency calls from a map for an emergency services platform. An emergency services platform (ESP) 102 provides an interface and management of the public-safety answering point (PSAP) 100 responsible for answering calls to an emergency telephone number, such as for example 911, for police, firefighting, and ambulance services. The ESP 102 can receive calls originating from different communications technologies by interfacing with different communication networks, for example a mobile device 124 initiating an emergency call via wireless network 120, public switch telephone network 130 receiving calls from telephones 134 or other data communication networks such data networks providing session initiated protocol (SIP) communication sessions such as voice or video over Internet protocol (VOIP) sessions. The network 120 is coupled with one or more location servers 126. The location servers 126 may use one or more Radio resource location services protocols (LCS protocol) such as global positioning system (GPS), assisted GPS (A-GPS) or network based location technologies. The network 130 is coupled to a location database 136 which provides location information associated with the calling number by using automatic location information (ANI) databases.

The ESP 102 receives communications from the various networks and converts the communications to a SIP based communication session with communication workstations 110, 112, 114, 116. Each position provides an operator client 110a for providing call management, identification and dispatch related to the selected emergency call. The map display 110b provides location information to identify the position of the particular emergency call or active or incoming emergency calls assigned to the PSAP 100. Each PSAP 100 will have multiple responders or operators 110, 112, 114, 116 for receiving and managing calls. In traditional system calls are assigned to operator positions based upon queue order. When a significant event occurs multiple calls may be received for the same event and be clustered in a geographical area. The disclosed system and method enable identification of incoming emergency calls on map displays 110b, 112b, 114b, 116b, and enable the operator to select specific calls on the map display which are transferred to their associated operator client 110a, 112a, 114a, 116a of the operator position by the emergency services platform 102. Calls can be assigned an incident identifier which can be displayed on the map display enabling easier identification incidents and related calls and to help in identifying call clusters related to the same incident.

Figure 2:
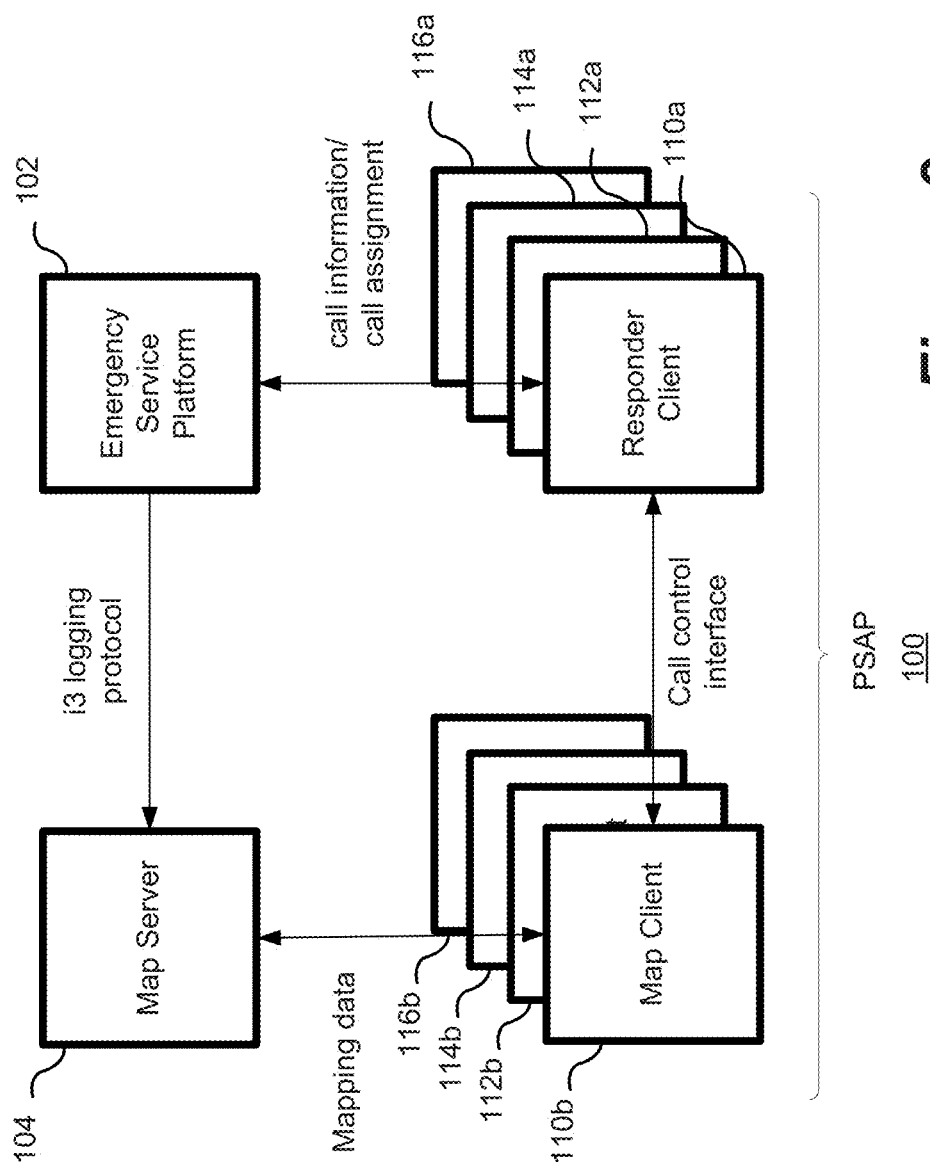
FIG. 2 is an illustrative representation of system for emergency call management.

FIG. 2 is an illustrative representation of a system for emergency call management. The ESP 102 receives incoming calls from one or more networks. Identification information received by location information is provided by automatic location information or radio resource location services protocol (LCS protocol) is provided to a map server 104 by leveraging information of the i3 Event Logging port to represent call information. Map clients 110b, 112b, 114b, 116b receiving mapping information from the map server 104. The mapping information can display a map of the area covered by the PSAP or detailed view of a particular location. To enable call selection the map client will identify emergency calls that are received by the PSAP. When an operator position 110, 112, 114, 116 is not associated with a call they can select a particular call from graphical user interface of the map client 110b, 112b, 114b, 116b to identify a request to direct to their particular position. Identification information pertaining to the position is provided through a call control interface to the respective operator client 110a, 112a, 114a, 116a. The operator client will then communicate with the ESP 102 to have the call directed to the respective station.

Figure 3:
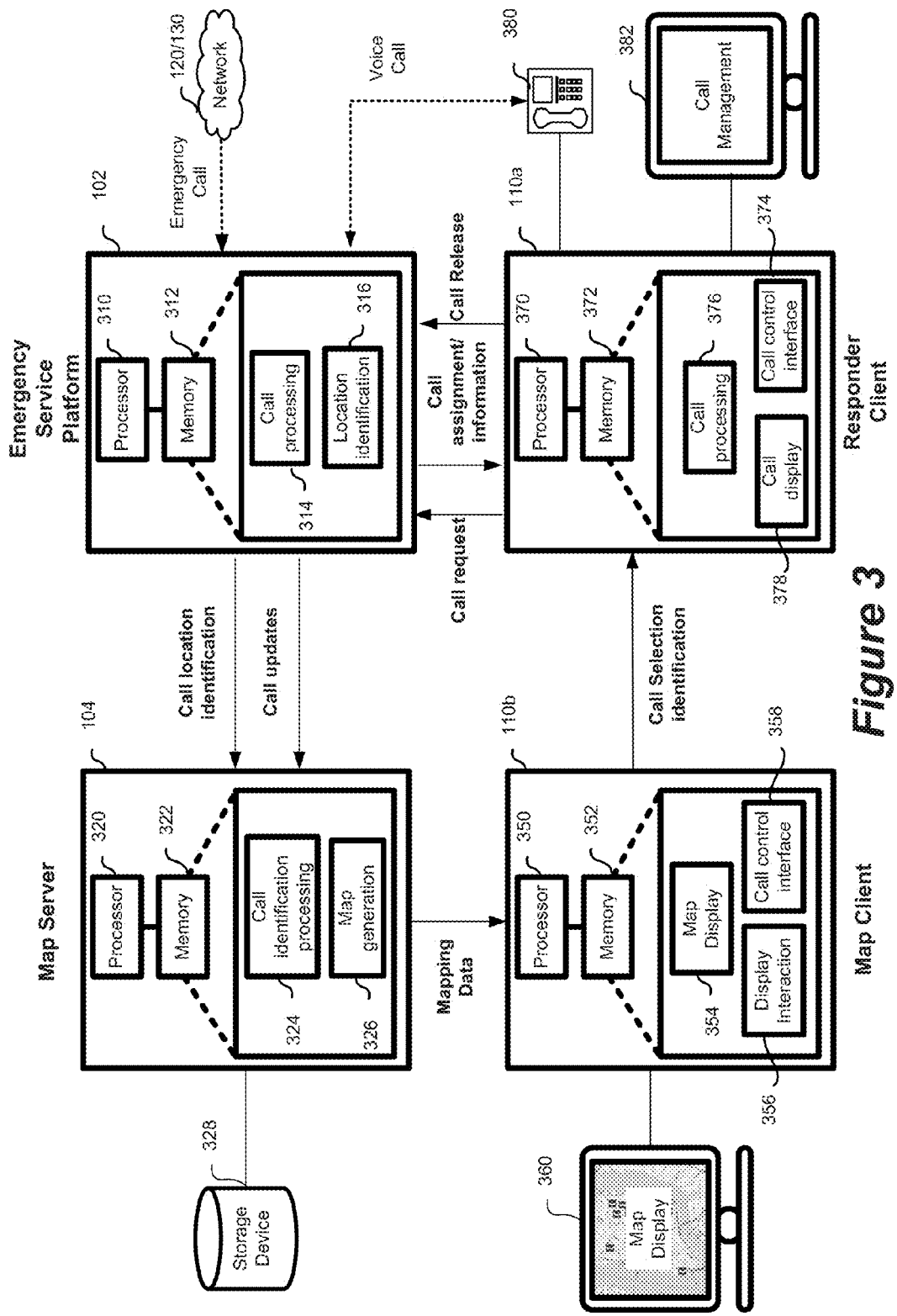
FIG. 3 is a system illustration showing components and interactions.

FIG. 3 is a system illustration showing components and interactions. The ESP 102 is coupled to one or more networks 120/130 for receiving various types of calls such as landline PSTN, VOIP, or mobile originated calls. The call is directed to the PSAP 102 based upon the number associated with the emergency services such as '911'. The ESP 102 may provide multiple conversion interfaces to convert the protocol of the original call to standard used by the PSAP 100 such as VOIP. The ESP 102 has at least a processor 310 for executing instructions from a memory 312. Functions such as call processing 314 which may include routing of the call and conversion to and from various communication protocols. A location identification function 316 may also be provided to process or determine location information associated with the source of the call. For example receiving location information from mobile devices from the associated mobile network provided by global positioning system (GPS) information, assisted-GPS, or network triangulation. Alternatively, for landline calls a location database may be utilized to determine the associated location for the source of the call. For VOIP original calls where location information is not available other location techniques may be utilized such as a database query or service provider location request to determine a location associated with a user identifier or IP address. When a call is received at the ESP 102 the location information is provided by the NENA i3 protocol interface to the map server 104. The call location identification assigns a call identifier and provides the location information. The map server 102 has at least a processor 320 and memory 322 containing instructions for providing functionality for process the call identification information 324 received by the i3 communication protocol which is then used for the map generation 326. A storage device 328 may be coupled to the map server 104 for storing geographic data. The map data is received by the map client 110b, having at least a processor 350 and memory 352. The memory providing functionality for receiving the map data and displaying the map data 354 in a graphical user interface, as well as functionality for enabling interaction in the graphical user interface 356. The user can interact with the map client 110b and select calls that are identified on the display 360. When a selection is made, a call control interface function 358 can communicate with the operator client 110a to identify call information associated by the ESP 102 with the call. The operator client 110a, which may be provided within the computing device of the map client, or vice versa, or as a separate computing device having at least a processor 370 and memory 372. The operator client 110a receives the call selection information from the map client 110b by a call control function 374. The operator client 110a interfaces with the ESP 102 to request routing of the associated call to the operator position. The ESP 102 can then provide the call and associated information to a call processing function 376 on the operator client 110a associated with the call for display by a call display function 378. A call management display 382 is provided and an operator position 380, such as a phone handset or headset 380. Updates on the assignment or location of the emergency call can be provided from the ESP 102 to the map server for display on the map client 110b. The updates may include identification of the operator assigned to a particular call, call associated with the same incident, available calls and priority of the calls. In addition when an operator releases a call, the associated call information would be updated or removed from the display. The ESP 102, map server 104, map client 110b and operator client 110a may be connected through associated network interfaces on the same local network or accessible through intermediary networks. Additional components may be associated with each of the computing devices to implement the functional described.

Figure 4:
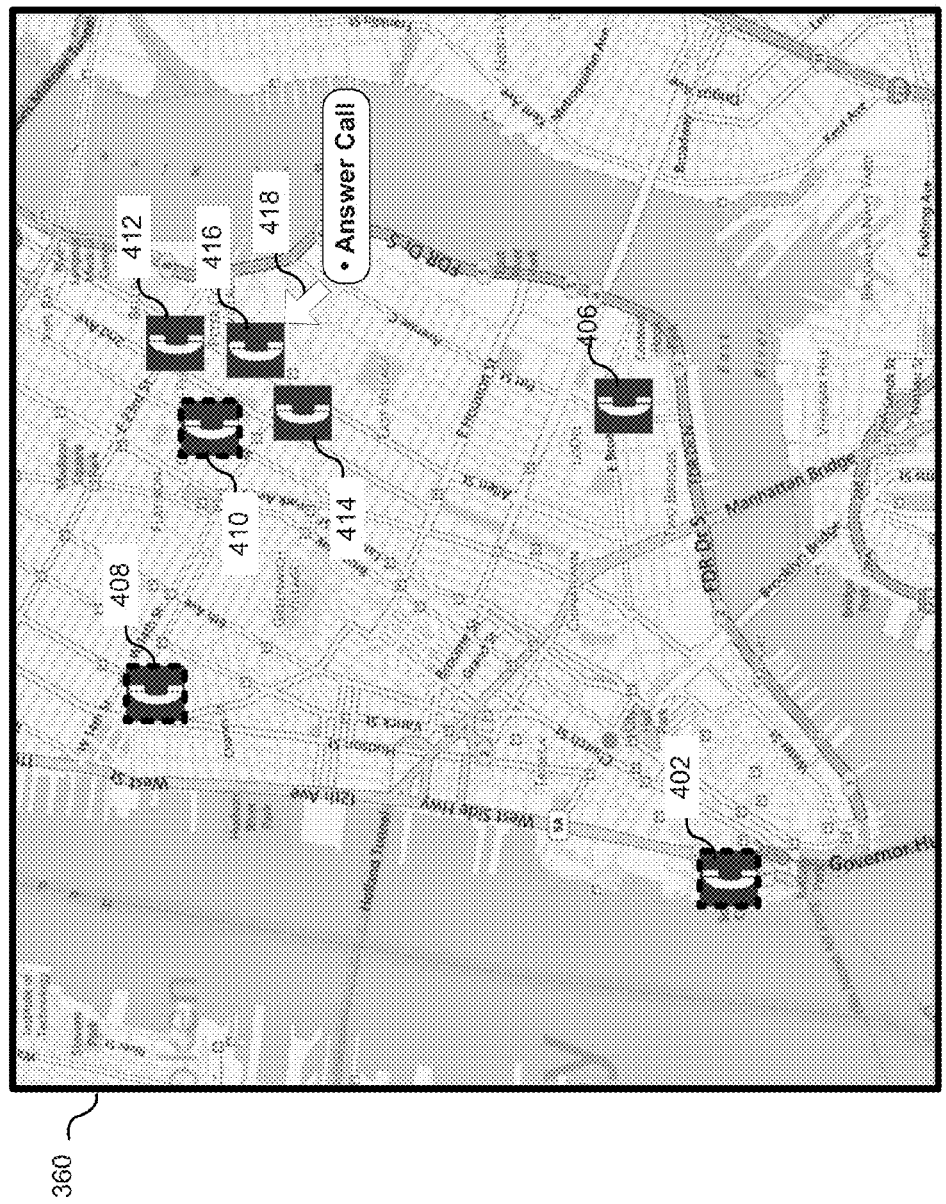
FIG. 4 is a representation of a map interface for enabling call interactions.

FIG. 4 is a representation of a map interface for enabling call interactions as would be provided on a map display 360. Multiple emergency calls 402-416 are displayed with the associated location information at an operator position 110, 112, 114, 116. Identification of the state of the call, for example if it has already been assigned to a operator, the amount of time that the call has been waiting, the nature of the call or priority of the call may also be identified. For example 402, 408 and 410 may be identified through a graphical representation to have been assigned to an operator. Similarly 410-416 may be identified as a potential call cluster for the same incident based upon the origination time or proximity to each other or by identification by the associated operators. Through the graphical interface the operator may interface and select an emergency call to be answered, for example a pointer 418 may be used to select a call event and present additional information or options regarding the call to the operator. When the operator selects a call to answer it can be transferred to the operator position. The graphical interface may allow selection by a cursor interface or enable a touch screen interaction with the interface to select particular emergency call events.

Figure 5:
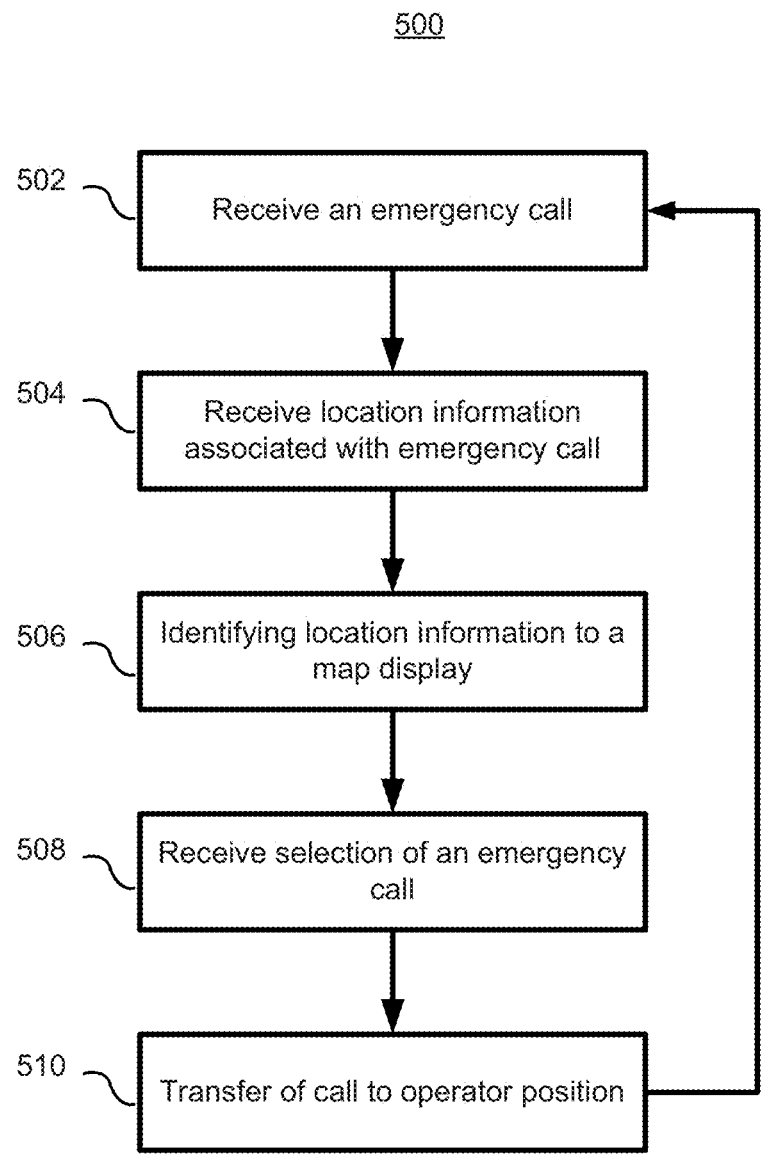
FIG. 5 is a method of answering or releasing emergency calls from a map display for an emergency services platform.

FIG. 5 is a method 500 of emergency call management for answering or releasing 911 calls from a map for an emergency services platform. The emergency call is received at a public safety access point (PSAP) (502). The emergency calls may originate for one or more public switched telephone networks (PSTN), mobile networks or a data networks coupled to an emergency services platform (ESP). Location information associated with the emergency call is received by the ESP and may be provided with the emergency call or by a query to a server or service associated with the originating network to determine appropriate location information (504). Using the i3 event logging protocol the location information associated with the emergency call is identified or transferred to a map server for display on a graphical map display (506). An operator can then select an emergency call from the display, from a plurality of emergency calls displayed on the graphical map display (508). The operator client can then request transfer of the call to the responder position from the ESP. The selected emergency call is then transferred to the operator client position associated with the graphical map display which made the selection (510).

Figure 6:
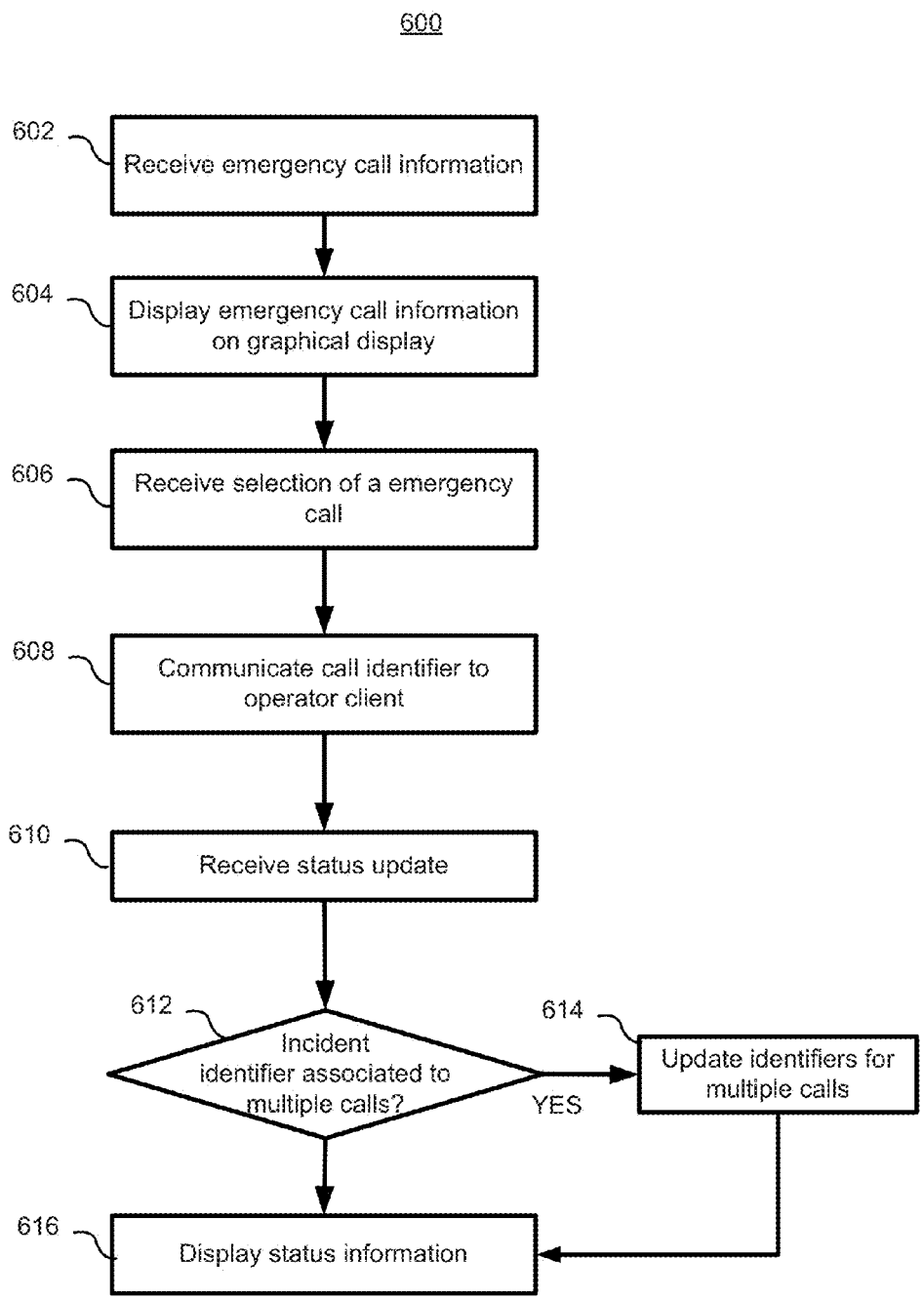
FIG. 6 is a method of displaying emergency calls on a map display.

FIG. 6 is a method 600 of displaying emergency calls on a map display. Emergency call information is received at the map display server from the ESP using the i3 event logging protocol (602). The emergency call information is displayed on the map display (604). Through the graphical user interface of the map display and emergency call may be selected to be answered by an associated operator position (606). The call identifier associated with the selected call is communicated to the operator client using a call control interface protocol (608). During the emergency call any status updates may be received via the ESP, for example location updates, association of an incident identifier, hold status, dispatch information, call release etc. (610). If an incident identifier is associated with more than one emergency call (YES at 612) the identifiers are updated for multiple calls (614). If the identifier is not updated (NO at 612), the updated status information is then displayed (616).

Figure 7:
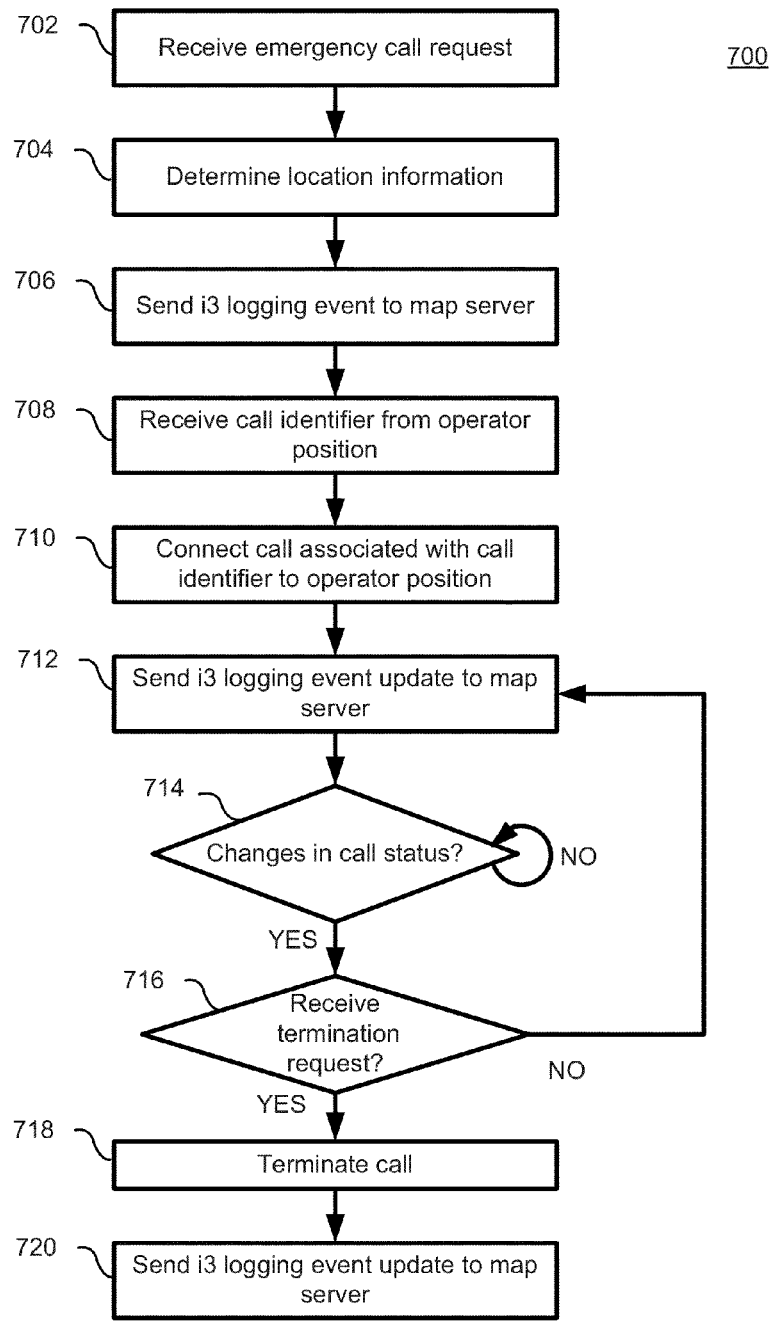
FIG. 7 is a method of processing emergency calls at an emergency services platform.

FIG. 7 is a method 700 of processing emergency calls at an emergency services platform. An emergency call request is received via a network coupled to the ESP (702). The emergency call request may include identification information to determine the location of the originating person or device or may need to be determined through a query to a database either locally to the ESP or related to the source network of the call (704). The call information can then be sent using the i3 logging event to map server (706) so to display the call visually in a graphical user interface to the operator positions. An operator can then select a call from their respective map display to answer the call. The map display provides an associated call identifier to the operator client which will provide the call identifier to the ESP (708). The call associated with the identifier is then converted to a SIP session and provided to the operator position (710). Any updates received by the ESP regarding the call are sent via the i3 logging event update messages to the map server for display (712). When there is a change in the call status (YES at 714), it is determined if the status change is a termination request (YES at 716) then the call is terminated (718) and the status update is sent by i3 logging event message is sent to the map server (720). If a termination request is not received (NO at 716) the status updated is sent by an i3 logging event update to map server (712). If a status update does not occur (NO at 714) the method waits until a change occurs.

Figure 8:
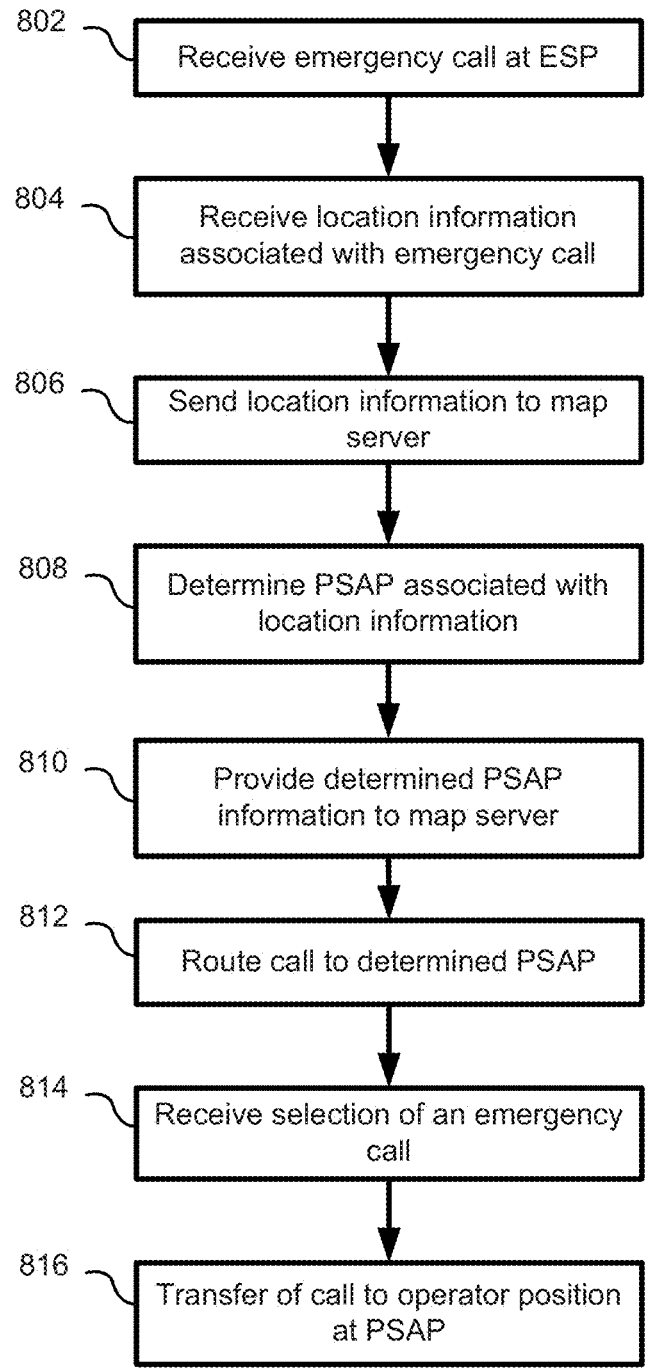
FIG. 8 is a method of processing emergency calls at in a multiple PSAP environment.

FIG. 8 shows a method 800 of processing emergency calls at an emergency services platform when multiple PSAPs are serviced by the ESP. An emergency call request is received via a network coupled to the ESP (802). The emergency call request may include identification information to determine the location of the originating person or device or may need to be determined through a query to a database either locally to the ESP or related to the source network of the call (804). The call information can then be sent using the i3 logging event to the map server (806). The ESP can then determine which PSAP in a multiple PSAP configuration should be assigned to the call (808). The assignment may be based upon location information or geographic considerations or other methods such as default routing, incoming trunk identification or automatic number identification (ANI) or electronic serial number (ESN) association by the ESP. Information regarding the determined PSAP can then be provided to the map server (810) to direct the call the appropriate map displays of the associated PSAP. The call can then be routed to the appropriate PSAP (812). The call can then be selected from a map display by an operator (814) and the call transferred to the associated operator position (816) at the associated PSAP. The method may be further modified to provide status functions as described in regards to the other methods.

The i3 event logging port is based on a web services (http post) and is strongly influenced by the logging services proposed in the NENA i3 functional specifications (008-003 Detailed Functional and Interface Specification for the NENA i3 Solution—Stage 3). Since not all of the events are relevant to answering/releasing calls from a map, a subset of the perceived relevant events are described here.

Operator Login Event

The Operator login event indicates that an operator has used a workstation to log into the ESP. Note that there may be me more than one login event when a workstation is equipped with multiple audio devices. Also, a logout event is also available to track the status of user agents.

This event looks like this:

```
<LogEvent>
    <timestamp>2015-08-21T12:58.03.01Z</timestamp>
    <agencyOrElement>psap.aleganny.pa.us</agencyOrElement>
    <agent>james.smith</agent>
    <eventType>Login</eventType>
    <login>
        <uri>tel:+6432341234</uri>
        <agentRole>operator</agentRole>
        <tenantGroup>Blabla</tenantGroup>
        <operatorId>001</operatorId>
        <workstation>OP1-02346</workstation>
```
-continued
```
        <deviceName>Headset</deviceName>
        <reason>normal</reason>
    </login>
</LogEvent>
```

This event is useful to compute which "agent", in the <agent> field, is logged in at what "workstation", which identifies a physical location of the operator in the <workstation> field. The "agent" value is also useful to correlate subsequent action of an agent, such as answering or releasing a call to a workstation.

Start Call Event

The start call event indicates a new incoming call into the ESP: this event might not have the location of the caller. This event looks like this:

```
<LogEvent>
    <timestamp>2015-08-21T12:58.03.01Z</timestamp>
    <agencyOrElement>esrp.state.pa.us</agencyOrElement>
    <agent>.</agent>
    <callIdentifier>_CI_114F67B7A08C00000000@esrp.state.pa.us</callIdentifier>
    <incidentIdentifier>_II_114F67B7A08C00000000@esrp.state.pa.us</incidentIdentifier>
    <eventType>StartCall</eventType>
    <startCall>
        <header>.</header>
        <location>Received PIDF_LO xml data</location>
        <mediaLabel>_ML_114F67B7A08C00000000@esrp.state.pa.us</mediaLabel>
        <incomingCallPolicy>IndianaBell911</incomingCallPolicy>
        <callType>NG911</callType>
        <controller>IQselectiveRouter</controller>
        <signallingType>VOIP</signallingType>
        <circuit>20/03/00/0089</circuit>
        <circuitId>84279385</circuitId>
        <trunkGroupId>101</trunkGroupId>
        <ani>9201230123</ani>
        <aniDomain>9201230123@esrp.state.il.us</aniDomain>
        <dnis>911</dnis>
        <pani>9201230123</pani>
        <callerName>Joe Smith</callerName>
    </startCall>
</LogEvent>
```

The call identifier <callidentifier> is used to associate subsequent events to the call.

The location field <location> in the StartCall event, is most often empty or contains only a "." This is because not many networks or devices are capable of sending the location (PIDF_LO) of a caller within the SIP INVITE. In those cases or if the location is only a reference, the ESP obtains the location of a caller by performing a HELD query to a LIS (location information system) or LLIS (legacy information system). In those cases, the MAP system can obtain the location from the HELD response event as shown below.

Note: Location related events will occur only for Call Type NG911.

HELD Query Response Event

When a call has not been received with location information or with location by reference, this event contains the call's location. The held field <held> contains the HELD response which contains the PIDF-LO which can be used to locate the call.

```
<LogEvent>
    <timestamp>2015-08-21T12:58.03.01Z</timestamp>
    <agencyOrElement>esrp.state.pa.us</agencyOrElement>
    <agent>.</agent>
    <callIdentifier>_CI_114F67B7A08C00000000@esrp.state.pa.us</callIdentifier>
    <incidentIdentifier>_II_114F67B7A08C00000000@esrp.state.pa.us</incidentIdentifier>
    <eventType>HELDresponse</eventType>
    <heldResponse>
```

```
            <mediaLabel>_ML_114F67B7A08C00000000@esrp.state.pa.us</mediaLabel>
            <heldDomain>.</heldDomain>
            <responseCode>200</responseCode>
            <held>
                <locationResponse xmlns="URN:ietf:params:xml:ns:geopriv:held">
                    <presence xmlns="URN:ietf:params:xml:ns:pidf:geopriv10"
                    entity="pres:ae3be8585902e2253ce2@10.102.23.9">
                        <tuple id="lisLocation">
                            <status>
                                <geopriv>
                                    <location-info>
                                        <ca:civicAddress
                                            ca="URN:ietf:params:xml:ns:pidf:geopriv10:civicAddr"
                                            xml:lang="en-au">
                                            <ca:country>AU</ca:country>
                                            <ca:A1>NSW</ca:A1>
                                            <ca:A3>Wollongong</ca:A3>
                                            <ca:A4>Gwynneville</ca:A4>
                                            <ca:STS>Northfield Avenue</ca:STS>
                                            <ca:LMK>University of Wollongong</ca:LMK>
                                            <ca:FLR>2</ca:FLR>
                                            <ca:NAM>The Corporation</ca:NAM>
                                            <ca:PC>2500</ca:PC>
                                            <ca:BLD>39</ca:BLD>
                                            <ca:SEAT>WS-183</ca:SEAT>
                                            <ca:POBOX>U40</ca:POBOX>
                                        </ca:civicAddress>
                                    </location-info>
                                    <usage-rules>
                                        <retransmission-allowed>false</retransmission-allowed>
                                        <retention-expiry>2007-05-25T12:35:02+10:00
                                        </retention-expiry>
                                    </usage-rules>
                                    <method>Wiremap</method>
                                </geopriv>
                            </status>
                            <timestamp>2007-05-24T12:35:02+10:00</timestamp>
                        </tuple>
                    </presence>
                </locationResponse>
            </held>
    </heldResponse>
</LogEvent>
```

Answer Event
The answer event indicates that a call has been answered. When the call is answered by an operator using an ESP workstation, the <agent> field identifies that agent. In other cases, the agent field is empty or contains a ".". In these cases, the event should be ignored by the MAP system.

```
<LogEvent>
    <timestamp>2015-08-21T12:58.03.01Z</timestamp>
    <agencyOrElement>esrp.state.pa.us</agencyOrElement>
    <agent>james.smith</agent>
    <callIdentifier>_CI_114F67B7A08C00000000@esrp.state.pa.us</callIdentifier>
    <incidentIdentifier>_II_114F67B7A08C00000000@esrp.state.pa.us</incidentIdentifier>
    <eventType>Answer</eventType>
    <answer>
        <mediaLabel>_ML_224F67B7A08C00000000@esrp.state.pa.us</mediaLabel>
        <controller>IQselectiveRouter</controller>
    </answer>
</LogEvent>
```

End Call Event
Indicates that a call has been terminated (all call legs have been released).

```
<LogEvent>
    <timestamp>2015-08-21T12:58.03.01Z</timestamp>
    <agencyOrElement>esrp.state.pa.us</agencyOrElement>
    <agent>.</agent>
    <callIdentifier>_CI_114F67B7A08C00000000@esrp.state.pa.us</callIdentifier>
    <incidentIdentifier>_II_114F67B7A08C00000000@esrp.state.pa.us</incidentIdentifier>
```

```
        <eventType>EndCall</eventType>
        <endCall>
            <responseCode>200</responseCode>
        </endCall>
</LogEvent>
```

More Detailed Call Tracking

Since the ESP can act as a conference bridge, the call model implemented in the ESP, is one that allows for several participants to be partaking into a call. Each participant is represented by a call leg. A call is identified by a unique callIdentifier and the call legs are identified by unique mediaLabels.

By using other LogEvents then the ones described in this document, it is possible for a MAP system to track calls at the call leg level and provided information such as abandon calls status.

Call Control Interface

Each CCI positions equipped with the proper plugin, listens for HTTP POST requests on port 2069 (the port can be modified by configuration).

When an HTTP POST request is received by a CCI position, the sender can expect an HTTP response in all cases except in the case of a socket error.

A response is any one of HTTP 200 Ok, HTTP 400 Bad Request, and HTTP 500 Internal Server Error.

Three types of requests currently exist; the content types of the HTTP POST requests are expected to be "text/xml" with the following xml bodies:

Heartbeat Request

When an operator is equipped with the Call Control Interface plugin, the state of the external link is provided on the operator screen. To maintain the state of the link "Ok" a Heartbeat requests must be received within 10 seconds of each other. That value can be modified by configuration.

```
<?xml version="1.0" encoding="utf-8"?>
<solacom-LEXCI version="1.0">
    <body>
        <command>
            <name>Heartbeat</name>
        </command>
    </body>
</solacom-LEXCI>
```

Answer Request

Used to answer a specific call; the call identified by the callIdentifier tag received in the Start Call event must be used.

```
<?xml version="1.0" encoding="utf-8"?>
<solacom-LEXCI version="1.0">
    <body>
        <command>
            <name>Answer</name>
            <answerParameters>
                <callIdentifier>_CI_114F67B7A08C00000000@esrp.
                state.pa.us</callIdentifier>
            </answerParameters>
        </command>
    </body>
</solacom-LEXCI>
```

Release Request

A call release request is used to release a call using the call leg identified by the callIdentifier tag received in the Start Call event.

```
<?xml version="1.0" encoding="utf-8"?>
<solacom-LEXCI version="1.0">
    <body>
        <command>
            <name>Release</name>
            <releaseParameters>
                <callIdentifier>_CI_114F67B7A08C00000000@esrp.state.
                pa.us</callIdentifier>
            </releaseArguments>
        </command>
    </body>
</solacom-LEXCI>
``` eventType

Start Call

Sent for every incoming call.

```
<LogEvent>
    <timestamp>2015-08-21T12:58.03.01Z</timestamp>
    <agencyOrElement>esrp.state.pa.us</agencyOrElement>
    <agent>.</agent>
    <callIdentifier>_CI_114F67B7A08C00000000@esrp.state.pa.
    us</callIdentifier>
    <incidentIdentifier>_II_114F67B7A08C00000000@esrp.state.pa.us
    </incidentIdentifier>
    <eventType>StartCall</eventType>
    <startCall>
        <header>.</header>
        <location>Received PIDF_LO xml data</location>
        <mediaLabel>_ML_114F67B7A08C00000000@esrp.state.pa.
        us</mediaLabel>
        <incomingCallPolicy>IndianaBell911</incomingCallPolicy>
        <callType>NG911</callType>
        <signallingType>VOIP</signallingType>
        <circuit>20/03/00/0089</circuit>
        <circuitId>84279385</circuitId>
        <trunkGroupId>101</trunkGroupId>
        <ani>9201230123</ani>
        <aniDomain>9201230123@esrp.state.il.us</aniDomain>
        <dnis>911</dnis>
        <pani>9201230123</pani>
        <callerName>Joe Smith</callerName>
    </startCall>
</LogEvent>
```

Received SDP

The Received SDP is sent for every VoIP incoming, transferred or outbound call. This event will only be provided in the phase 2 of the logging service development.

```
<LogEvent>
    <timestamp>2015-08-21T12:58.03.01Z</timestamp>
    <agencyOrElement>esrp.state.pa.us</agencyOrElement>
    <agent>.</agent>
    <callIdentifier>_CI_114F67B7A08C00000000@esrp.state.pa.us
    </callIdentifier>
    <incidentIdentifier>_II_114F67B7A08C00000000@esrp.state.pa.
    us</incidentIdentifier>
    <eventType>Media</eventType>
```

HELD Query

The HELD query is sent every time the system does an Held query. Note, the HELD queries performed for the purpose of a manual ALI query or for re-bids.

```
<LogEvent>
    <timestamp>2015-08-21T12:58.03.01Z</timestamp>
    <agencyOrElement>esrp.state.pa.us</agencyOrElement>
    <agent>.</agent>
    <callIdentifier>_CI_114F67B7A08C00000000@esrp.state.pa.us
    </callIdentifier>
    <incidentIdentifier>_II_114F67B7A08C00000000@esrp.state.pa.us
    </incidentIdentifier>
    <eventType>HELDquery</eventType>
    <heldQuery>
        <mediaLabel>_ML_114F67B7A08C00000000@esrp.state.pa.us
        </mediaLabel>
        <heldDomain>.</heldDomain>
        <heldPurpose>InitialLocation</heldPurpose>
        <held-uri>tel:+9201230123</held-uri>
    </heldQuery>
</LogEvent>
```

HELD Response

The HELD response is sent every time the system receives a Held query response.

```
<LogEvent>
    <timestamp>2015-08-21T12:58.03.01Z</timestamp>
    <agencyOrElement>esrp.state.pa.us</agencyOrElement>
    <agent>.</agent>
    <callIdentifier>_CI_114F67B7A08C00000000@esrp.state.pa.us
    </callIdentifier>
    <incidentIdentifier>_II_114F67B7A08C00000000@esrp.state.pa.us
    </incidentIdentifier>
    <eventType>HELDresponse</eventType>
    <heldResponse>
        <mediaLabel>_ML_114F67B7A08C00000000@esrp.state.pa.us
        </mediaLabel>
        <heldDomain>.</heldDomain>
        <responseCode>200</responseCode>
        <held>
          <locationResponse xmlns=
          "URN:ietf:params:xml:ns:geopriv:held">
            <presence xmlns="URN:ietf:params:xml:ns:pidf:geopriv10"
              entity="pres:ae3be8585902e2253ce2@10.102.23.9">
              <tuple id="lisLocation">
                <status>
                  <geopriv>
                    <location-info>
                      <ca:civicAddress
                          ca=
                          "URN:ietf:params:xml:ns:pidf:geopriv10:civicAddr"
                          xml:lang="en-au">
                        <ca:country>AU</ca:country>
                        <ca:A1>NSW</ca:A1>
                        <ca:A3>Wollongong</ca:A3>
                        <ca:A4>Gwynneville</ca:A4>
                        <ca:STS>Northfield Avenue</ca:STS>
                        <ca:LMK>University of Wollongong</ca:LMK>
                        <ca:FLR>2</ca:FLR>
                        <ca:NAM>Andrew Corporation</ca:NAM>
                        <ca:PC>2500</ca:PC>
                        <ca:BLD>39</ca:BLD>
                        <ca:SEAT>WS-183</ca:SEAT>
                        <ca:POBOX>U40</ca:POBOX>
                      </ca:civicAddress>
                    </location-info>
                    <usage-rules>
                      <retransmission-allowed>false</retransmission-allowed>
                      <retention-expiry>2007-05-25T12:35:02+10:00
                      </retention-expiry>
                    </usage-rules>
                    <method>Wiremap</method>
                  </geopriv>
                </status>
                <timestamp>2007-05-24T12:35:02+10:00</timestamp>
              </tuple>
            </presence>
          </locationResponse>
        </held>
    </heldResponse>
</LogEvent>
```

ECRF Query

The ECRF query is sent Sent every time the system does an ECRF/LoST query.

```
<LogEvent>
    <timestamp>2015-08-21T12:58.03.01Z</timestamp>
    <agencyOrElement>esrp.state.pa.us</agencyOrElement>
    <agent>.</agent>
    <callIdentifier>_CI_114F67B7A08C00000000@esrp.state.pa.us
    </callIdentifier>
    <incidentIdentifier>_II_114F67B7A08C00000000@esrp.state.pa.us
    </incidentIdentifier>
    <eventType>ECRFquery</eventType>
    <ecrfQuery>
        <mediaLabel>_ML_114F67B7A08C00000000@esrp.state.pa.us
        </mediaLabel>
        <ecrfDomain>.</ecrfDomain>
        <service-urn>nena:service:sos</service-urn>
        <ecrfPurpose>routing</ecrfPurpose>
        <location>PIDF_LO xml data</location>
    </ecrfQuery>
</LogEvent>
```

ECRF Response

The ECRF response is sent every time the system receives a LoST response.

```
<LogEvent>
    <timestamp>2015-08-21T12:58.03.01Z</timestamp>
    <agencyOrElement>esrp.state.pa.us</agencyOrElement>
    <agent>.</agent>
    <callIdentifier>_CI_114F67B7A08C00000000@esrp.state.pa.us
    </callIdentifier>
    <incidentIdentifier>_II_114F67B7A08C00000000@esrp.state.pa.us
    </incidentIdentifier>
    <eventType>ECRFresponse</eventType>
    <ecrfResponse>
        <mediaLabel>_ML_114F67B7A08C00000000@esrp.state.pa.us
        </mediaLabel>
        <ecrfDomain>.</ecrfDomain>
        <responseCode>200</responseCode>
        <lost>.</lost>
    </ecrfResponse>
</LogEvent>
```

VPC Query

The VPC query is sent every time the system does a VPC query.

```
<LogEvent>
    <timestamp>2015-08-21T12:58.03.01Z</timestamp>
    <agencyOrElement>esrp.state.pa.us</agencyOrElement>
    <agent>.</agent>
    <callIdentifier>_CI_114F67B7A08C00000000@esrp.state.pa.us
```

```
</callIdentifier>
<incidentIdentifier>_II_114F67B7A08C00000000@esrp.state.pa.us
</incidentIdentifier>
<eventType>VPCquery</eventType>
<vpcQuery>
    <mediaLabel>_ML_114F67B7A08C00000000@esrp.state.pa.us
    </mediaLabel>
    <vpcDomain>.</vpcDomain>
    <ani>8195551234</ani>
    <dnis>911</dnis>
</vpcQuery>
</LogEvent>
```

VPC Response

The VPC response is sent every time the system receives a VPC response.

```
<LogEvent>
    <timestamp>2015-08-21T12:58.03.01Z</timestamp>
    <agencyOrElement>esrp.state.pa.us</agencyOrElement>
    <agent>.</agent>
    <callIdentifier>_CI_114F67B7A08C00000000@esrp.state.pa.us
    </callIdentifier>
    <incidentIdentifier>_II_114F67B7A08C00000000@esrp.state.pa.us
    </incidentIdentifier>
    <eventType>VPCresponse</eventType>
    <vpcResponse>
    <mediaLabel>_ML_114F67B7A08C00000000@esrp.state.pa.us
    </mediaLabel>
        <vpcDomain>.</vpcDomain>
        <responseCode>200</responseCode>
        <esrn>8197781234</esrn>
        <esqk>8195551010</esqk>
        <esn>4500</esn>
    </vpcResponse>
</LogEvent>
```

SRDB Query

The SRDB query is sent every time the system does an SRDB dip.

```
<LogEvent>
    <timestamp>2015-08-21T12:58.03.01Z</timestamp>
    <agencyOrElement>esrp.state.pa.us</agencyOrElement>
    <agent> </agent>
    <callIdentifier>_CI_114F67B7A08C00000000@esrp.state.pa.us
    </callIdentifier>
    <incidentIdentifier>_II_114F67B7A08C00000000@esrp.state.pa.us
    </incidentIdentifier>
    <mediaLabel>_ML_114F67B7A08C00000000@esrp.state.pa.us
    </mediaLabel>
    <eventType>SRDBquery</eventType>
    <ani></ani>
</LogEvent>
```

SRDB Response

The SRDB response is sent every time the system receives a response from the SRDB.

```
<LogEvent>
    <timestamp>2015-08-21T12:58.03.01Z</timestamp>
    <agencyOrElement>esrp.state.pa.us</agencyOrElement>
    <agent> </agent>
    <callIdentifier>_CI_114F67B7A08C00000000@esrp.state.pa.us
    </callIdentifier>
    <incidentIdentifier>_II_114F67B7A08C00000000@esrp.state.pa.us
    </incidentIdentifier>
    <mediaLabel>_ML_114F67B7A08C00000000@esrp.state.pa.us
    </mediaLabel>
    <eventType>SRDBresponse</eventType>
    <esn></esn>
</LogEvent>
```

ALI Query

The ALI query is sent every time the system does an ALI query. This event will only be provided in the phase 2 of the logging service development.

```
<LogEvent>
    <timestamp>2015-08-21T12:58.03.01Z</timestamp>
    <agencyOrElement>esrp.state.pa.us</agencyOrElement>
    <agent>.</agent>
    <callIdentifier>_CI_114F67B7A08C00000000@esrp.state.pa.us
    </callIdentifier>
    <incidentIdentifier>_II_114F67B7A08C00000000@esrp.state.pa.us
    </incidentIdentifier>
    <mediaLabel>_ML_114F67B7A08C00000000@esrp.state.pa.us
    </mediaLabel>
    <eventType>ALIquery</eventType>
    <aliQuery>
        <mediaLabel>_ML_114F67B7A08C00000000@esrp.state.pa.us
        </mediaLabel>
        <aliLink>ATT link 1</aliLink>
        <uri>tel:+8197781234</uri>
    </aliQuery>
</LogEvent>
```

ALI Response

The ALI response is sent every time the system receives an ALI response. This event will only be provided in the phase 2 of the logging service development.

```
<LogEvent>
    <timestamp>2015-08-21T12:58.03.01Z</timestamp>
    <agencyOrElement>esrp.state.pa.us</agencyOrElement>
    <agent>.</agent>
    <callIdentifier>_CI_114F67B7A08C00000000@esrp.state.pa.us
    </callIdentifier>
    <incidentIdentifier>_II_114F67B7A08C00000000@esrp.state.pa.us
    </incidentIdentifier>
    <eventType>ALIresponse</eventType>
    <aliResponse>
        <mediaLabel>_ML_114F67B7A08C00000000@esrp.state.pa.us
        </mediaLabel>
        <aliLink>ATT link 1</aliLink>
        <ali>Raw ALI text</ali>
    </aliResponse>
</LogEvent>
```

Routed Call

Sent for every outbound calls that have been has a consequence to the system receiving an inbound call. The outbound call could be towards a remote system or phone device or another type of device capable of handling a call or towards an operator position.

```
<LogEvent>
    <timestamp>2015-08-21T12:58.03.01Z</timestamp>
    <agencyOrElement>esrp.state.pa.us</agencyOrElement>
    <agent>.</agent>
    <callIdentifier>_CI_114F67B7A08C00000000@esrp.state.pa.us</callIdentifier>
    <incidentIdentifier>_II_114F67B7A08C00000000@esrp.state.pa.us</incidentIdentifier>
    <eventType>Route</eventType>
    <route>
        <uri>tel:+6432341234</uri>
        <rule>CountyXPsapRoute2</rule>
        <reason>normal</reason>
        <mediaLabel>_ML_224F67B7A08C00000000@esrp.state.pa.us</mediaLabel>
        <attempt>1</attempt>
        <priority>1</priority>
        <ani>9200000003</ani>
        <aniDomain>9201230123@esrp.state.il.us</aniDomain>
        <dnis>6432341234</dnis>
        <pani>8191230987</pani>
        <callerName>Joe Smith</callerName>
        <aniTranslated>9200000003</aniTranslated>
        <dnisTranslated>6432341234</dnisTranslated>
        <callerNameTranslated>8191230987</callerNameTranslated>
    </route>
</LogEvent>
```

Answered Call
The answered call message is sent every time a call is answered.

```
<LogEvent>
    <timestamp>2015-08-21T12:58.03.01Z</timestamp>
    <agencyOrElement>esrp.state.pa.us</agencyOrElement>
    <agent>james.smith</agent>
    <callIdentifier>_CI_114F67B7A08C00000000@esrp.state.pa.us</callIdentifier>
    <incidentIdentifier>_II_114F67B7A08C00000000@esrp.state.pa.us</incidentIdentifier>
    <eventType>Answer</eventType>
    <answer>
        <mediaLabel>_ML_224F67B7A08C00000000@esrp.state.pa.us</mediaLabel>
    </answer>
</LogEvent>
```

Transferred Call
The transferred call message is sent for every transfer or conference attempt.

```
<LogEvent>
    <timestamp>2015-08-21T12:58.03.01Z</timestamp>
    <agencyOrElement>esrp.state.pa.us</agencyOrElement>
    <agent>.</agent>
    <callIdentifier>_CI_114F67B7A08C00000000@esrp.state.pa.us</callIdentifier>
    <incidentIdentifier>_II_114F67B7A08C00000000@esrp.state.pa.us</incidentIdentifier>
    <eventType>TransferCall</eventType>
    <transferCall>
        <transferTarget>tel:+ 6432341234</transferTarget>
        <mediaLabel>_ML_2334F67B7A08C00000000@esrp.state.pa.us</mediaLabel>
        <rule>CountyXPsapRoute2</rule>
        <reason>normal</reason>
        <attempt>1</attempt>
        <priority>1</priority>
        <ani>9200000003</ani>
        <aniDomain>9201230123@esrp.state.il.us</aniDomain>
        <dnis>6432341234</dnis>
        <pani>8191230987</pani>
        <aniTranslated>9200000003</aniTranslated>
        <dnisTranslated>6432341234</dnisTranslated>
        <callerNameTranslated>Joe Smith</callerNameTranslated>
    </transferCall>
</LogEvent>
```

Hold Call Leg
The Hold call leg message is sent every time a call leg is placed on hold.

```
<LogEvent>
    <timestamp>2015-08-21T12:58.03.01Z</timestamp>
    <agencyOrElement>esrp.state.pa.us</agencyOrElement>
    <agent>james.smith</agent>
    <callIdentifier>__CI__114F67B7A08C00000000@esrp.state.pa.us</callIdentifier>
    <incidentIdentifier>__II__114F67B7A08C00000000@esrp.state.pa.us</incidentIdentifier>
    <eventType>Hold</eventType>
    <hold>
        <mediaLabel>__ML__224F67B7A08C00000000@esrp.state.pa.us</mediaLabel>
    </hold>
</LogEvent>
```

15

Hold Retrieved
Sent every time a call leg is retrieved form hold

```
<LogEvent>
    <timestamp>2015-08-21T12:58.03.01Z</timestamp>
    <agencyOrElement>esrp.state.pa.us</agencyOrElement>
    <agent>james.smith</agent>
    <callIdentifier>__CI__114F67B7A08C00000000@esrp.state.pa.us</callIdentifier>
    <incidentIdentifier>__II__114F67B7A08C00000000@esrp.state.pa.us</incidentIdentifier>
    <eventType>HoldRetrieved</eventType>
    <holdRetrieved>
        <mediaLabel>__ML__224F67B7A08C00000000@esrp.state.pa.us</mediaLabel>
    </holdRetrieved>
</LogEvent>
```

Set Mute
The Set Mute message is sent every time a call leg is muted.

```
<LogEvent>
    <timestamp>2015-08-21T12:58.03.01Z</timestamp>
    <agencyOrElement>esrp.state.pa.us</agencyOrElement>
    <agent>james.smith</agent>
    <callIdentifier>__CI__114F67B7A08C00000000@esrp.state.pa.us</callIdentifier>
    <incidentIdentifier>__II__114F67B7A08C00000000@esrp.state.pa.us</incidentIdentifier>
    <eventType>MuteOn</eventType>
    <muteOn>
        <mediaLabel>__ML__224F67B7A08C00000000@esrp.state.pa.us</mediaLabel>
    </muteOn>
</LogEvent>
```

Remove Mute
The Remove Mute message is sent every time a call leg is unmuted.

```
<LogEvent>
    <timestamp>2015-08-21T12:58.03.01Z</timestamp>
    <agencyOrElement>esrp.state.pa.us</agencyOrElement>
    <agent>james.smith</agent>
    <callIdentifier>__CI__114F67B7A08C00000000@esrp.state.pa.us</callIdentifier>
    <incidentIdentifier>__II__114F67B7A08C00000000@esrp.state.pa.us</incidentIdentifier>
    <eventType>MuteOff</eventType>
    <muteOff>
        <mediaLabel>__ML__224F67B7A08C00000000@esrp.state.pa.us</mediaLabel>
    </muteOff>
</LogEvent>
```

Set Privacy
The Set Privacy message is sent every time a call leg is set to privacy mode.

```
<LogEvent>
    <timestamp>2015-08-21T12:58.03.01Z</timestamp>
    <agencyOrElement>esrp.state.pa.us</agencyOrElement>
    <agent>james.smith</agent>
    <callIdentifier>__CI__114F67B7A08C00000000@esrp.state.pa.us</callIdentifier>
    <incidentIdentifier>__II__114F67B7A08C00000000@esrp.state.pa.us</incidentIdentifier>
    <eventType>PrivacyOn</eventType>
    <privacyOn>
        <mediaLabel>__ML__224F67B7A08C00000000@esrp.state.pa.us</mediaLabel>
    </privacyOn>
</LogEvent>
```

Remove Privacy
The Remove Privacy message is sent every time a call leg is removed from privacy.

```
<LogEvent>
    <timestamp>2015-08-21T12:58.03.01Z</timestamp>
    <agencyOrElement>esrp.state.pa.us</agencyOrElement>
    <agent>james.smith</agent>
    <callIdentifier>__CI__114F67B7A08C00000000@esrp.state.pa.us</callIdentifier>
    <incidentIdentifier>__II__114F67B7A08C00000000@esrp.state.pa.us</incidentIdentifier>
    <eventType>PrivacyOff</eventType>
    <privacyOff>
        <mediaLabel>__ML__224F67B7A08C00000000@esrp.state.pa.us</mediaLabel>
    </privacyOff>
</LogEvent>
```

Merge Calls
Send every time two conversations or conferences are merged together. In following logs, the callIdentifier1 or callIdentifier2 can be used to reference any action to the call or call legs. Same applies to IncidentIdentifiers. This event can only occur on systems equipped with operator positions.

```
<LogEvent>
    <timestamp>2015-08-21T12:58.03.01Z</timestamp>
    <agencyOrElement>esrp.state.pa.us</agencyOrElement>
    <agent>james.smith</agent>
    <callIdentifier>__CI__114F67B7A08C00000000@esrp.state.pa.us</callIdentifier>
    <incidentIdentifier>__II__114F67B7A08C00000000@esrp.state.pa.us</incidentIdentifier>
    <eventType>MergeCall</eventType>
    <mergeCall>
        <callIdentifier2>__CI__114F67B7A08C00000000@esrp.state.pa.us</callIdentifier2>
        <incidentIdentifier2>__II__114F67B7A08C00000000@esrp.state.pa.us</incidentIdentifier2>
    </mergeCall>
</LogEvent>
```

Outbound Call
Send every time an outbound call is done by an operator. This event will only occur on systems equipped with operator positions.

```
<LogEvent>
    <timestamp>2015-08-21T12:58.03.01Z</timestamp>
    <agencyOrElement>esrp.state.pa.us</agencyOrElement>
    <agent>james.smith</agent>
    <callIdentifier>__CI__114F67B7A08C00000000@esrp.state.pa.us</callIdentifier>
    <incidentIdentifier>__II__114F67B7A08C00000000@esrp.state.pa.us</incidentIdentifier>
    <eventType>OuboundCall</eventType>
    <outboundCall>
        <outboundTarget>tel:+6432341234</outboundTarget>
        <rule>CountyXPsapRoute2</rule>
        <reason>normal</reason>
        <mediaLabel>__ML__224F67B7A08C00000000@esrp.state.pa.us</mediaLabel>
        <attempt>1</attempt>
        <priority>1</priority>
        <ani>9200000003</ani>
```

```
        <aniDomain>9201230123@esrp.state.il.us</aniDomain>
        <dnis>6432341234</dnis>
        <pani>8191230987</pani>
        <callerName>Joe Smith</callerName>
        <aniTranslated>9200000003</aniTranslated>
        <dnisTranslated>6432341234</dnisTranslated>
        <callerNameTranslated>8191230987</callerNameTranslated>
    </outboundCall>
</LogEvent>
```

End Media
Sent every time a call leg ends i.e. the media stream is terminated.

```
<LogEvent>
    <timestamp>2015-08-21T12:58.03.01Z</timestamp>
    <agencyOrElement>esrp.state.pa.us</agencyOrElement>
    <agent>.</agent>
    <callIdentifier>__CI__114F67B7A08C00000000@esrp.state.pa.us</callIdentifier>
    <incidentIdentifier>__II__114F67B7A08C00000000@esrp.state.pa.us</incidentIdentifier>
    <eventType>EndMedia</eventType>
    <endMedia>
        <mediaLabel>__ML__114F67B7A08C00000000@esrp.state.pa.us</mediaLabel>
        <responseCode>200</responseCode>
        <voiceQOS>
            <mediaIpSourceAddr>10.10.10.10</mediaIpSourceAddr>
            <mediaIpDestAddr>10.10.10.10</mediaIpDestAddr>
            <mediaUdpRtpSourcePort>5000</mediaUdpRtpSourcePort>
            <mediaUdpRtpDestPort>5000</mediaUdpRtpDestPort>
            <mediaNumOfIpPktRxed>1</mediaNumOfIpPktRxed>
            <mediaNumOfIpPktTxed>1</mediaNumOfIpPktTxed>
            <mediaNumOfIpErroredPktRxed>1</mediaNumOfIpErroredPktRxed>
            <mediaNumOfRtpPktRxed>1</mediaNumOfRtpPktRxed>
            <mediaNumOfRtpPktTxed>1</mediaNumOfRtpPktTxed>
            <mediaNumOfRtpPktLost>1</mediaNumOfRtpPktLost>
            <mediaNumOfRtpPktDiscarded>1</mediaNumOfRtpPktDiscarded>
            <mediaRtpJitter>1</mediaRtpJitter>
            <mediaRtpLatency>1</mediaRtpLatency>
            <mediaNumOfRtcpPktRxed>1</mediaNumOfRtcpPktRxed>
            <mediaNumOfRtcpPktTxed>1</mediaNumOfRtcpPktTxed>
            <mediaFarEndPacketLostPercentage>1</mediaFarEndPacketLostPercentage>
            <mediaFarEndCumulativePacketLost>1</mediaFarEndCumulativePacketLost>
            <mediaFarEndInterarrivalJitter>1</mediaFarEndInterarrivalJitter>
        </voiceQOS>
    </endMedia>
</LogEvent>
```

End Call
Sent at the end of a call when all call legs or media stream have been terminated.

```
<LogEvent>
    <timestamp>2015-08-21T12:58.03.01Z</timestamp>
    <agencyOrElement>esrp.state.pa.us</agencyOrElement>
    <agent>.</agent>
    <callIdentifier>__CI__114F67B7A08C00000000@esrp.state.pa.us</callIdentifier>
    <incidentIdentifier>__II__114F67B7A08C00000000@esrp.state.pa.us</incidentIdentifier>
    <eventType>EndCall</eventType>
    <endCall>
        <responseCode>200</responseCode>
    </endCall>
</LogEvent>
```

Login
The Login message is sent every time an operator logs in. This event can only occur on systems equipped with operator positions.

```
<LogEvent>
    <timestamp>2015-08-21T12:58.03.01Z</timestamp>
    <agencyOrElement>psap.aleganny.pa.us</agencyOrElement>
    <agent>james.smith</agent>
    <eventType>Login</eventType>
    <login>
        <uri>tel:+6432341234</uri>
        <agentRole>operator</agentRole>
        <tenantGroup>Blabla</tenantGroup>
        <operatorId>001</operatorId>
        <workstation>PC Host name</deviceName>
        <deviceName>Headset</deviceName>
        <reason>normal</reason>
    </login>
</LogEvent>
```

Logout
The Logout message is sent every time an operator logs out. This event can only occur on systems equipped with operator positions.

```
<LogEvent>
    <timestamp>2015-08-21T12:58.03.01Z</timestamp>
    <agencyOrElement>psap.aleganny.pa.us</agencyOrElement>
    <agent>james.smith</agent>
    <eventType>Login</eventType>
    <logout>
        <uri>tel:+6432341234</uri>
        <agentRole>operator</agentRole>
        <tenantGroup>Blabla</tenantGroup>
        <operatorId>001</operatorId>
        <workstation>PC Host name</deviceName>
        <deviceName>Headset</deviceName>
    </logout>
</LogEvent>
```

Event Elements
Timestamp
As per the i3 specs, a timestamp is represented by an ISO 8601 time point. An example of a timestamp is 2015-08-21T12:58.03.01Z. All time within the ESInet is represented as UTC (Zulu) time.
agencyOrElement
As per i3 specs, this tag should contain the domain name of an Agency (PSAP) or system (ESRP). For example esrp.state.pa.us. This tag is configurable as a string of characters (30 characters max.) in the incoming call policies.
callIdentifier
As per the i3 spec, the first element in the first ESInet which handles a call assigns the Call Identifier. The form of a Call Identifier is a URI consisting of the string "_CI_", a unique string, the "@" character, and the domain name of the element that first handled the call. For example: "_CI_a56e556d871@esrp.state.pa.us". The unique string must be unique for each call the element handles over time. The length of the unique string must be between 10 and 30 characters.
If the NENA i3 CallIdentifier is not received in the incoming call signalling, we use our internal session id number prefixed with "_CI_" and suffixed with @"agencyOrElement".
incidentIdentifier
As per the i3 spec, a real world occurrence such as a heart attack, car crash or a building fire for which one or more calls may be received is an Incident. Examples include a traffic accident (including subsequent secondary crashes), a hazardous material spill, etc. Multiple Calls may be associated with an Incident. An Incident may include other Incidents in a hierarchical fashion. The form of an Incident Tracking Identifier is a URI consisting of the string "_II_", a unique string, the "@" character, and the domain name of the entity that first declared the incident. For example: "_II_a564w443112z@esrp.state.pa.us". The unique string must be unique for each Incident the element handles over time. One way to create the unique string is to use a timestamp with a suffix that differentiates multiple Incidents if they could be created by an element in the same instant. Implementations using multiple physical devices to implement a redundant element may need an additional component to guarantee uniqueness. Incident Tracking Identifiers are globally unique. By definition, there is an Incident associated with every call. As a practical matter, there is at least one call associated with every Incident, except those incidents declared by an agent (such as a policeman observing a traffic incident). Incident Tracking Identifiers may be assigned to a call prior to determining what real world incident it actually belongs to.
If the NENA i3 incidentIdentifier is not received in the incoming call signalling, the session id number is used prefixed with "_II_" and suffixed with @"agencyOrElement".
mediaLabel
A call on a B2BUA or on a conference bridge is constituted of at least 2 call legs, one for the caller and one for the called party. For a 3 party conference call, it is made of 3 call legs. The i3 specs calls for the mediaLabel to be taken from the SDP Label Attribute (RFC4574). Because SDP mediaLabels are only unique within an SIP session when acting as B2BUA, this form of mediaLabel cannot be used to uniquely identify a call leg.
The i3 definition of a mediaLabel has been extended to uniquely identify each of the call legs and also to apply to non-VoIP call legs.
The form of a Media Label is a URI consisting of the string "_ML_", the internal session id number, the "@" character, and the domain name of the element that first handled the call. For example: _ML_a56e556d871@esrp.state.pa.us". The unique string is provided by the internal session id number prefixed with "_ML_" and suffixed with @"agencyOrElement".
Header
For VoIP calls only, a copy of the headers in the received INVITE message. This element will only be provided in the phase 2 of the logging service development.
incomingCallPolicy
Name of the Incoming Call Policy line that was used to process the call.
callType
Designates the type of call the call treatment that will be applied to the call. The following values exist:
E911: Legacy call received from a CO or a VoIP provider.
SR911: Legacy call received from a selective router capable of performing Selective and/or Fixed transfers.
NG911: A location routing query (LoST) will be performed on the call.
AdminEmergency: The call will ring as an admin call but the all of the 911 functions except i3 transfer queries are available.
Admin: Administrative call treatment is applied.
signallingType
Type of signalling used for this call leg.
Circuit
Physical location of the bearer circuit that is used for the call leg (Shelf, Slot, Span, Channel).
circuitId
Number representing the physical location of the bearer circuit that was used for the call leg (Shelf, Slot, Span, Channel).
trunkId
Trunk group id of the bearer channel that was used for the call leg.

Ani

ANI is Automated Number Identification. It is the telephone number of the calling party (phone number of the station originating the call).

aniDomain

For VoIP call legs only, it contains the telephone number and IP address or DNS of a VoIP device from which the call is originating.

Dnis

DNIS is Directory Number Identification Service. For an inbound call leg, it is the telephone number that was dialled by the origination station. For an outbound call leg, it is the targeted station's telephone number. For outbound calls, this number can also be an ESRN used in i2 IP calls.

Pani

Pseudo ANI is sometimes called ESRK for Emergency Service Routing Key. Normally associated to cellular emergency calls, it is a 10 digit number that uniquely identifies call. It is used to correlate the emergency services call with an emergency service zone and a record containing the location information for the call. A selective router uses this number to route the call and a PSAP to query the ALI database.

For non-cellular call legs and non-VoIP call legs, this field can be identical ani field or may be left empty.

calerName

A name associated to the calling device. This service is not always available. The service requires to be supported by the signalling method by which the call reached the system and it requires to be enabled by the incoming call service provider Note that on legacy 911 trunks (CAMA trunks) this information is not available.

Udp

For VoIP calls, it contains the entire SDP (RFC2327 Session Description Protocol) which is a description of the media that is received in a SIP INVITE.

heldDomain

Address that was used to make an HELD query or address from which an HELD response was received. Normally this address should be the address of a LIS or a Legacy LIS.

heldPurpose

Purpose for which an HELD query is performed. The following values are possible:

InitialLocation; HELD query was performed to get the initial location of a call i.e. the call was receive w/o any location information.

Dereferencing; HELD query was performed to obtain location of a call which was received with a location reference. This value will only be provided in the phase 2 of the logging service development.

Manual; HELD query was performed upon the request of an operator. This value will only be provided in the phase 2 of the logging service development.

AutoRebid; HELD query was automatically performed to update the location of a moving caller. This value will only be provided in the phase 2 of the logging service development.

Held-Uri

A URI identifying the device for which a location is required or a uri that can be used to find the location of a device (deferring). For legacy calls tel URIs will be used.

responseCode

Context dependent response code; in the case of HELP, LoST and VPC queries are HTTP response codes or an error message string. For endMedia and end call, they are release cause as per Q.850

Held

Contains the XML portion of the HELD response. Normally it should contain the following elements:

| Label | Description | Type | Example |
|---|---|---|---|
| country | 2-letter ISO code | alpha | US |
| A1 | national subdivision (e.g., state) | alpha | NY |
| A2 | county, parish | alpha | King's County |
| A3 | city, township | alpha | New York |
| A4 | city division, borough | alpha | Manhattan |
| A5 | neighborhood | alpha | Morningside Heights |
| A6 | street | alphanumeric | Broadway |
| PRD | leading street direction | alpha | N |
| POD | trailing street suffix | alpha | SW |
| STS | street suffix | alpha | Ave |
| HNO | house number | alphanumeric | 123 |
| HNS | house number suffix | alphanumeric | A, ½ |
| LMK | Landmark or vanity address | alphanumeric | Columbia University |
| LOC | additional location info | alphanumeric | South Wing |
| NAM | name (residence or office occupant) | alphanumeric | Town Barber Shop |
| PC/ZIP | postal/zip code | alphanumeric | 10027-0401 |
| BLD | building (structure) | alphanumeric | Low Library |
| UNIT | unit (apartment, suite) | alphanumeric | Apt 42 |
| FLR | floor | alphanumeric | 4 |
| ROOM | room | alphanumeric | 450F |
| PLC | type of place | | Alpha |
| PCN | postal community name | alpha | Leonia |
| POBOX | post office box (P.O. box) | numeric | 12345 |
| ADDCODE | additional code | alphanumeric | 132030000003 |
| SEAT | Seat (desk, workstation, cubicle) | alphanumeric | WS 181 |
| RD | primary road name | alphanumeric | Broadway |
| RDSEC | road section | alphanumeric | 14 |
| RDBR | branch road name | alphanumeric | Lane 7 |
| RDSUBBR | sub-branch road name | alphanumeric | Alley 8 |
| PRM | Road name pre-modifier | alphanumeric | Old |
| POM | Road name post-modifier | alphanumeric | Service | ecrfDomain

Address that was used to make an LoST query or address from which an LoST response was received. Normally the specified address maps to an ECRF.

Service-Urn

As per the i3 specs, all SIP-based emergency calls pass location information either by value (PIDF-LO) or by reference (Location URI) plus a "Service URN" to an Emergency Services Routing Proxy (ESRP) to support routing of emergency calls. The ESRP passes the Service URN and location information via the LoST interface to an Emergency Call Routing Function (ECRF), which determines the next hop in routing a call to the requested service. The ECRF performs the mapping of the call's location information and requested Service URN to a "PSAP URI" by querying its data and then returning the URI provided. Using the returned URI and other information (time-of-day, PSAP state, etc.), the ESRP then applies policy from a Policy-based Routing Function (PRF) to determine the appropriate routing URI.

When a call is not received with a service-urn, the service-urn is provided by the incoming call policies.

ecrfPurpose
Purpose for which a LoST (ECRF) query is performed. The following values are possible:
   routing; a LoST query to an ECRF is performed to get routing information.
   transfer a LoST query to an ECRF is performed to get transfer information.

Location
Specifies the location for which a LoST query is attempted i.e. the location for which routing or transfer information is to be retrieved. The location can be in civic or geodic format.

LoST
Contains the XML portion of the LoST/ECRF response vpcDomain
Address that was used to make a VPC query as per NENA 12 or address from which a VPC response was received.

Esrn
An Emergency Services Routing Number is a 10-digit number that is returned by a VoIP Positioning Center and that is to be used to route the call.

Esqk
An Emergency Services Query Key is digit string that is returned by a VoIP Positioning Center and that uniquely identifies an ongoing emergency services call. It is used to correlate the emergency services call with the a record containing the location information for the call. It is to be used by a PSAP to query the ALI database.

Esn
   An Emergency Service Number is a three to five digit number representing a unique combination of emergency service agencies (Law Enforcement, Fire, and Emergency Medical Service) designated to serve a specific range of addresses within a particular geographical area, or Emergency Service Zone (ESZ). The ESN facilitates selective routing and selective transfer, if required, to the appropriate PSAP and the dispatching of the proper service agency (ies).

aliLink
An name (string of characters) that identifies a link or a set of link going to an ALI database (could be virtual link when IP is used).

aliResponse
Contains the raw response received from an ALI database truncated at 512 characters.

Uri
Contains the resulting destination address (after outgoing call policy treatment) for a routed call.

Reason
A text string <reason> for choosing that route. It can take the following values:
   normal; initial (top priority) route
   overflowMax; when the maximum number of calls on a previous route was exceeded.
   overflowNone: no operators are available on that route.
   alternate: a failure as occurred on the previous route.
   recording: a recording leg is being created.

Rule
A text string that identifies the route that was chosen.

Attempt
Number of attempts made on this route.

Priority
The priority assigned to this route based on the routing policies.

aniTranslated
Contains the ANI of the outbound call after outgoing call policy treatment (see ani).

dnisTranslated
Contains the DNIS of the outbound call after outgoing call policy treatment (see dnis).

callerNameTranslated
Contains the Caller Name of the outbound call after outgoing call policy treatment (see callerName).

transferTarpet
Identifies the transfer target after outgoing call policy treatment.

outboundTarpet
Identifies the outbound call target after outgoing call policy treatment.

voiceQOS
For VoIP calls, provides quality indicators for the call leg that was terminated.
   medialpSourceAddr; bearer (audio stream) source IP address of the call leg.
   medialpDestAddr; bearer (audio stream) destination IP address of the call leg.
   mediaUdpRtpSourcePort; bearer (audio stream) source port address of the call leg.
   mediaUdpRtpDestPort; bearer (audio stream) destination port address of the call leg.
   mediaNumOfIpPktRxed; number of IP packets received on bearer (audio stream) port used for the call leg.
   mediaNumOfIpPktTxed; number of IP packets transmitted on bearer (audio stream) port used for the call leg.
   mediaNumOfIpErroredPktRxed; number of IP packets received with an error on bearer (audio stream) port used for the call leg
   mediaNumOfRtpPktRxed; number of RTP packets received on bearer (audio stream) port used for the call leg.
   mediaNumOfRtpPktTxed; number of RTP packets transmitted on bearer (audio stream) port used for the call leg.
   mediaNumOfRtpPktLost; number of RTP received packets lost on bearer (audio stream) port used for the call leg.
   mediaNumOfRtpPktDiscarded; number of RTP received packets discarded (late arrival, too far out of sequence, error, . . . ) on bearer (audio stream) port used for the call leg.
   mediaRtpJitter; amount of RTP jitter for the received packets on bearer (audio stream) port used for the call leg.
   mediaRtpLatency; amount of RTP delay for the received packets on bearer (audio stream) port used for the call leg.
   mediaNumOfRtcpPktRxed; number of RTCP packets received on bearer (audio stream) port used for the call leg.
   mediaNumOfRtcpPktTxed; number of RTCP packets transmitted on bearer (audio stream) port used for the call leg.
   mediaFarEndPacketLostPercentage; percentage of packet lost declared by the far end of the bearer (audio stream) port used for the call leg. Requires RTCP.
   mediaFarEndCumulativePacketLost; number of packet lost declared by the far end of the bearer (audio stream) port used for the call leg. Requires RTCP.
   mediaFarEndInterarrivalJitter; amount of RTP jitter declared by the far end of the bearer (audio stream) port used for the call leg. Requires RTCP.

Agent
User name of the logged agent.

agentRole
Role that was assigned to the agent when the log in occurred.

tenantGroup
Identifies the Tenant Group to which the operator physical position pertains to. This may not be provided or it could be left empty in some system where only one tenant exits.

operatorId
An index that is assigned to the operator's physical position.

Workstation
Host name of an operator workstation.

Figure 9:
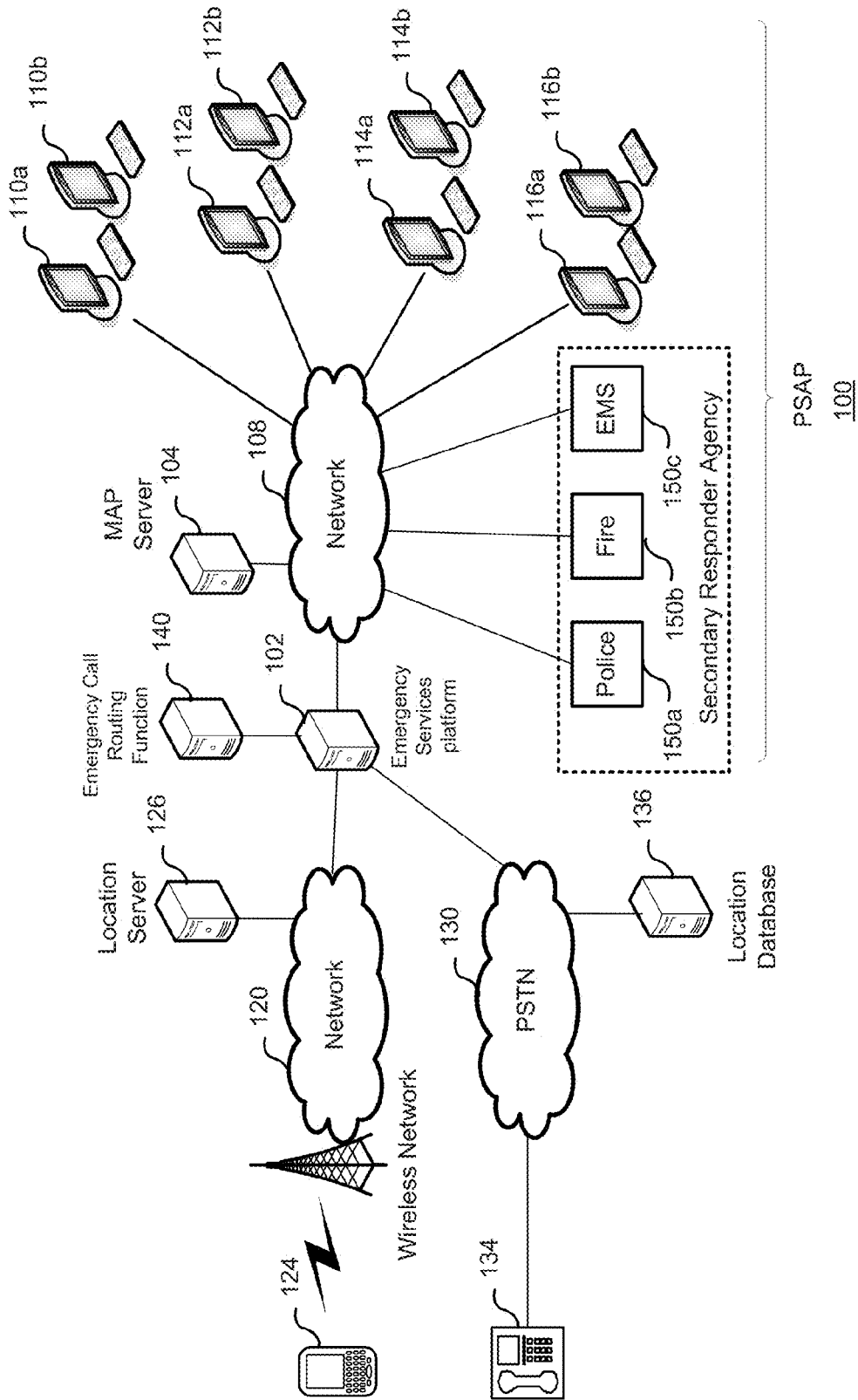
FIG. 9 is a system for answering or releasing emergency calls from a map for an emergency services platform providing emergency call routing function (ECRF) to route call to a responding service.

FIG. 9 is a system for answering or releasing emergency calls from a map for an emergency services platform providing emergency call routing function (ECRF) to route call to a responding service. The ESP 102 receives communications from the various networks and converts the communications to a SIP based communication session with communication workstations 110, 112, 114, 116. Each position provides an operator client 110a for providing call management, identification and dispatch related to the selected emergency call. The map display 110b provides location information to identify the position of the particular emergency call or active or incoming emergency calls assigned to the PSAP 100. Each PSAP 100 will have multiple responders or operators 110, 112, 114, 116 for receiving and managing calls. In traditional system calls are assigned to operator positions based upon queue order. When a significant event occurs multiple calls may be received for the same event and be clustered in a geographical area. The disclosed system and method enable identification of incoming emergency calls on map displays 110b, 112b, 114b, 116b, and enable the operator to select specific calls on the map display which are transferred to their associated operator client 110a, 112a, 114a, 116a of the operator position by the emergency services platform 102 or transferred to a secondary responding agency such as police, fire or EMS related PSAP or operator positions. Calls can be assigned an incident identifier which can be displayed on the map display enabling easier identification incidents and related calls and to help in identifying call clusters related to the same incident. In this embodiment the operator position may assign a call to a secondary responding agency 150 which is associated with the PSAP 100, associated with another PSAP or operator positions. In order to route the call to an responding agency 150, such as for example police 150a, fire 150b, or an emergency medical service (EMS) 150c an emergency call routing function (ECRF) 140 can be utilized to determine possible responding agencies and change the end point of the emergency call. The ECRF can receive location information and a service uniform resource name (URN) to return a uniform resource identifier (URI) used to route the emergency call toward the appropriate PSAP or further to a responding agency. Depending on the identity and credentials of the entity requesting the routing information, the response may identify the PSAP or an Emergency Services Routing Proxy (ESRP) that acts on behalf of the PSAP to provide final routing to the PSAP itself. The same database used to route a call to the correct PSAP may also be used to subsequently route the call to the correct responder, e.g., to support selective transfer capabilities. Depending on the type of routing function requested, the response may identify a secondary agency. The operator position may be provided with selection buttons to select a responding or secondary agency. The selection may be provided on the map display or call management interface to initiate a transfer to the responding service 150. The transfer may also require the call to be transferred through another PSAP depending on the origination of the call and the associated responding services.

Figure 10:
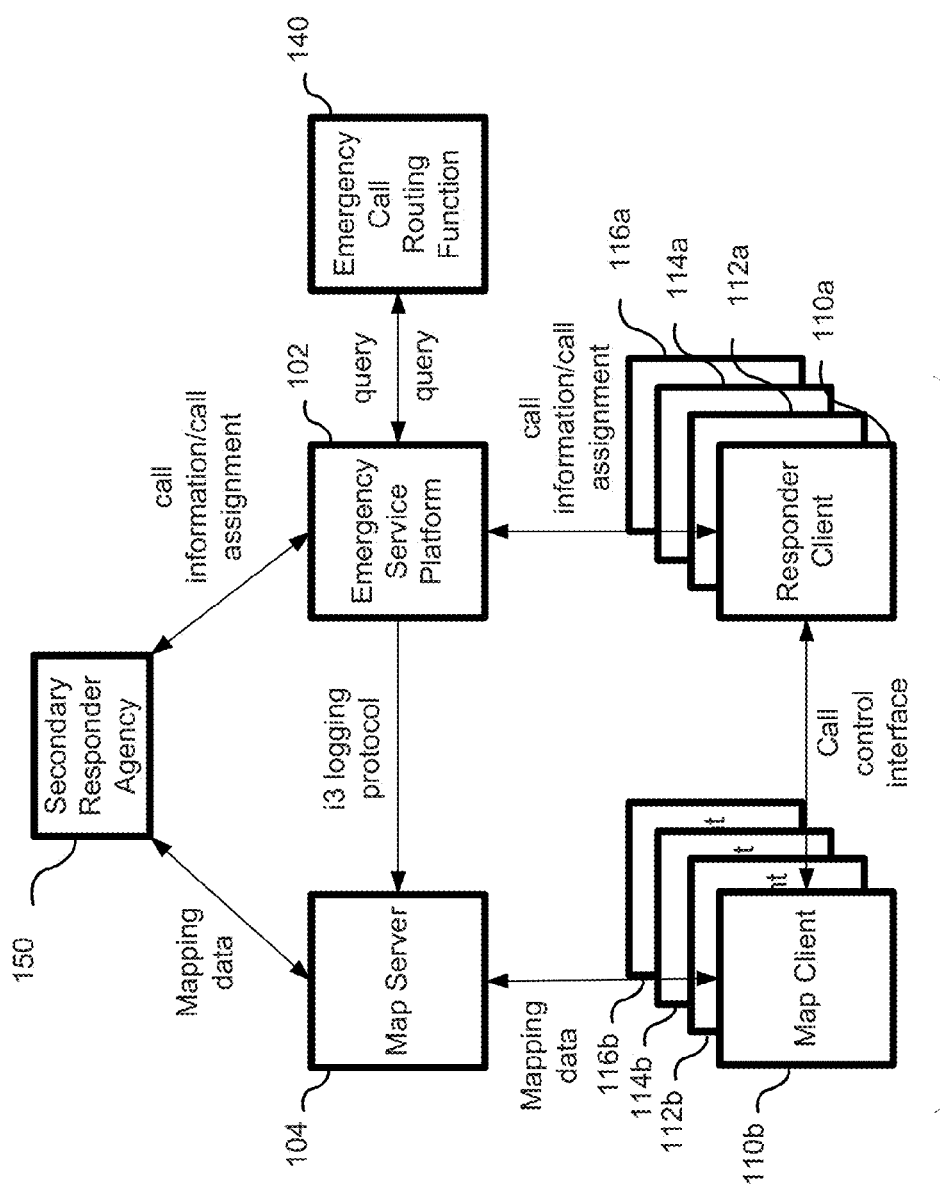
FIG. 10 is an illustrative representation of a system for emergency call management utilizing emergency call routing function to change the end point of the emergency call.

FIG. 10 is an illustrative representation of a system for emergency call management utilizing emergency call routing function to change the end point of the emergency call. As with FIG. 2, the ESP 102 receives incoming calls from one or more networks. Identification information received by location information is provided by automatic location information or radio resource location services protocol (LCS protocol) is provided to a map server 104 by leveraging information of the i3 Event Logging port to represent call information. Map clients 110b, 112b, 114b, 116b receiving mapping information from the map server 104. The mapping information can display a map of the area covered by the PSAP or detailed view of a particular location. To enable call selection the map client will identify emergency calls that are received by the PSAP. When an operator position 110, 112, 114, 116 is not associated with a call they can select a particular call from graphical user interface of the map client 110b, 112b, 114b, 116b to identify a request selection of the emergency to be directed to the operator and/or to transfer the call to a secondary responder agency. Identification information pertaining to the position is provided through a call control interface to the respective operator client 110a, 112a, 114a, 116a. The operator client will then communicate with the ESP 102 to have the call directed to the respective station or secondary responder agency. If the call is to be routed to a secondary responder agency, the ECRF receives location information (either civic address or geo-coordinates) and a Service URN. The ECRF can then provide URI for identifying secondary responder agency 150. The ESP 102 can then initiate call transfer to the responding agency 150a, 150b, or 150c. The operator may be presented with display buttons, toolbars, menus or pop-ups for selecting a responder agency to initiate the call transfer either through a responder client interface in software or via a hardware selection component.

Figure 11:
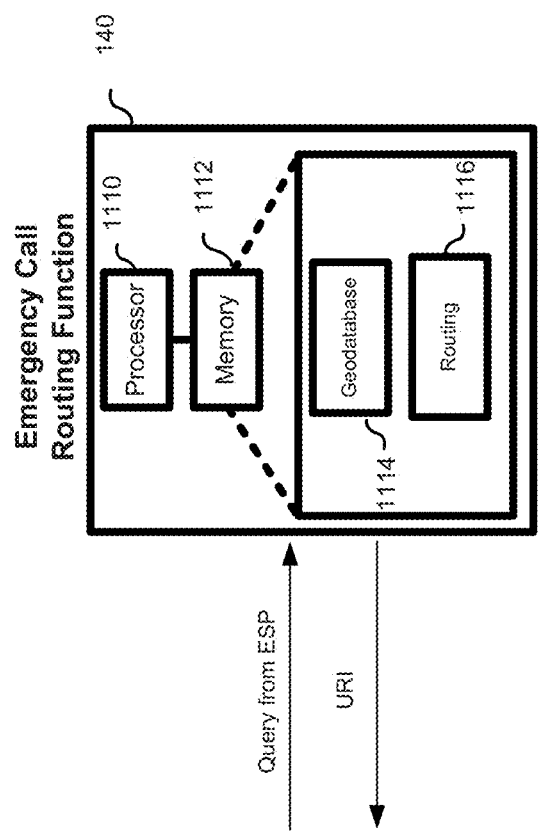
FIG. 11 is a system illustration of an ECRF module.

FIG. 11 is a system illustration of an ECRF module. The ECRF 140 is coupled to one or more networks 120/130 for communicating with the ESP 102. The ESP provides a query to the ECRF 140 providing location information and a service uniform resource name (URN) to return a uniform resource identifier (URI) used to route the emergency call toward the appropriate PSAP or further to a responding agency. The ECRF 140 may a separate system or integrated as part of the ESP 102 or MAP 104. The ECRF 140 has at least a processor 1110 for executing instructions from a memory 1112. Functions such as a geo-database 1114 defining secondary responder areas and routing information 1116 to identify how to route calls can also be provided.

Figure 12:
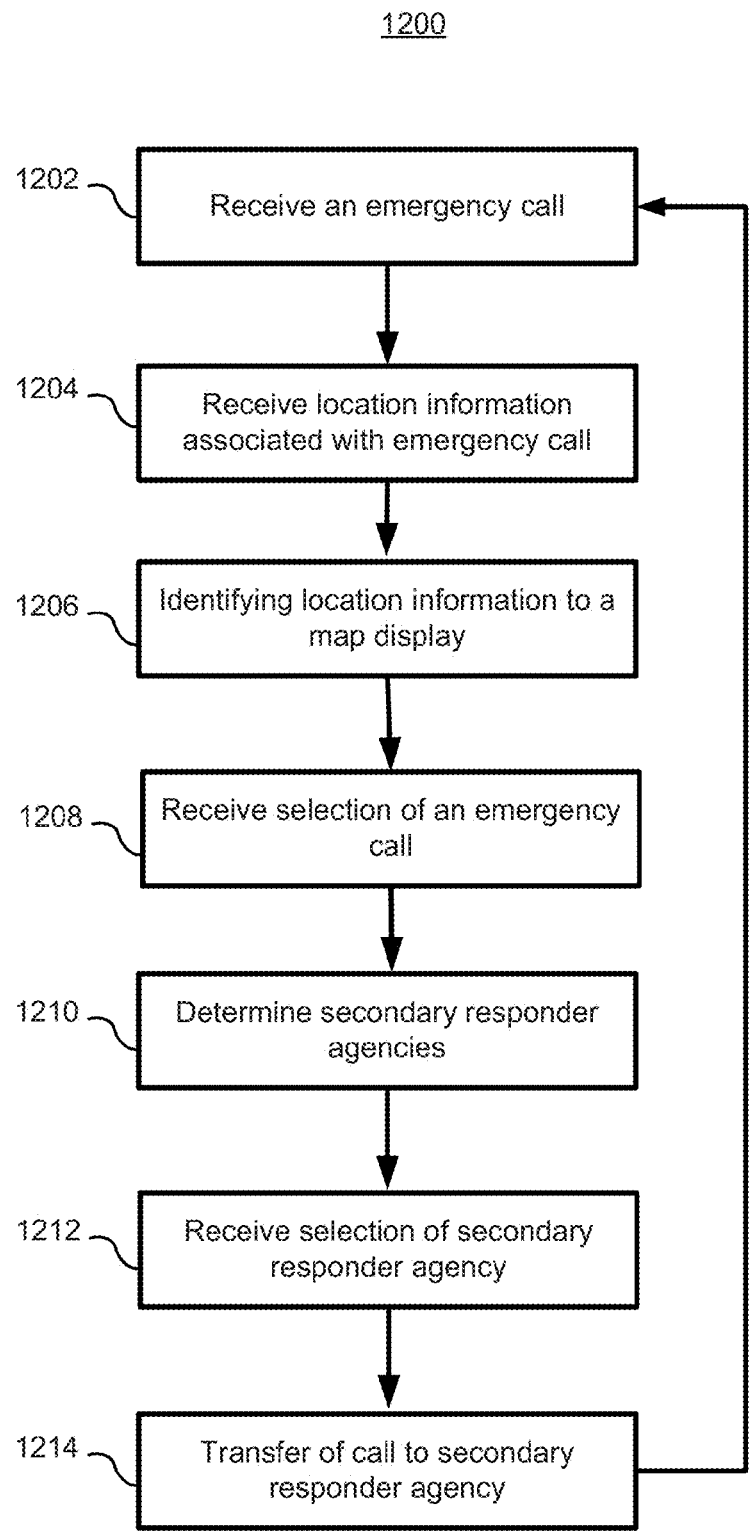
FIG. 12 is a method of initiating a call transfer to a secondary responding agency.

FIG. 12 is a method 1200 of initiating a call transfer to a secondary responding agency. The emergency call is received at a public safety access point (PSAP) (1202). The emergency calls may originate for one or more public switched telephone networks (PSTN), mobile networks or a data networks coupled to an emergency services platform (ESP). Location information associated with the emergency call is received by the ESP and may be provided with the emergency call or by a query to a server or service associated with the originating network to determine appropriate location information (1204). Using the i3 event logging protocol the location information associated with the emergency call is identified or transferred to a map server for display on a graphical map display (1206). An operator can then select an emergency call from the display, from a plurality of emergency calls displayed on the graphical map display (1208). The selection of the call may also include transferring the call to the associated operator position by the ESP. Secondary responder agencies such as police, firm or EMS can then be determined by a query to the ECRF (1210) and can be also presented on the map display using the i3 protocol. The selections can then be presented to the operator upon determining the type of emergency call or based upon service available in the area or a type of incident cluster. Once a selection is made (1212), the operator client can then request transfer of the call to the selected secondary responder agency. The selected emergency call is then transferred to the responder agency associated with the graphical map display which made the selection (1214). The secondary emergency agency may be associated with the PSAP or another PSAP location. The call may be directed to an operator position associated with the secondary emergency agency or handed off to another PSAP or ESP associated with the selected secondary emergency agency. Additionally or alternatively, the determination of the secondary responder agencies may be made at the time the call is received at the PSAP by an operator. The secondary responder agencies available for transfer maybe identified on the map display when the call is received or when the call is selected or subsequent to the call being answered by an operator. Once the call is selected by the operator (1208), the call may be transferred to the operator position as per FIGS. 5-8 prior to being sent to a secondary responder agency. The operator associated with position may answer the call and then transfer the call to one of the identified secondary responder agencies.

Although certain methods, apparatus, and articles of manufacture have been described herein, the scope of coverage of this patent is not limited thereto. To the contrary, this patent covers all methods, apparatus, computer readable memory, and articles of manufacture fairly falling within the scope of the appended claims either literally or under the doctrine of equivalents.

Each element in the embodiments of the present disclosure may be implemented as hardware, software/program, or any combination thereof. Software codes, either in its entirety or a part thereof, may be stored in a non-transitory computer readable medium or memory (e.g., as a RAM, ROM, for example a non-volatile memory such as flash memory, CD ROM, DVD ROM, Blu-ray™, a semiconductor ROM, USB, or a magnetic recording medium, for example a hard disk). The program may be in the form of source code, object code, a code intermediate source and object code such as partially compiled form, or in any other form. The software is executed by one or more processors using instructions for performing system and method for risk assessment, anonymization strategy and dataset anonymization. The dataset may be stored locally or remotely on network based storage. The dataset may be saved as a new dataset or portion thereof.

It would be appreciated by one of ordinary skill in the art that the system and components shown in Figures may include components not shown in the drawings. For simplicity and clarity of the illustration, elements in the figures are not necessarily to scale, are only schematic and are non-limiting of the elements structures. It will be apparent to persons skilled in the art that a number of variations and modifications can be made without departing from the scope of the invention as defined in the claims.

The invention claimed is:

1. A method of emergency call management, the method comprising:
   receiving an emergency call at an emergency service platform (ESP) providing an interface to one or more communication networks;
   receiving location information associated with the emergency call;
   identifying the location of the emergency call on a graphical map display by providing location information from the ESP to a map server by a National Emergency Number Association (NENA) event logging protocol to provide location and status information associated with the emergency call, the map server providing mapping data to the graphical map display based upon the received location information;
   receiving a selection of the emergency call from a plurality of emergency calls displayed on the graphical map display;
   determining one or more secondary responder agencies for the selected emergency call;
   receiving a selection of a secondary responder agency from the one or more secondary responder agencies; and
   initiating a transfer of the selected emergency call to one of the one or more secondary responder agencies;
   wherein the map server receives identification of a public safety access point (PSAP) associated with the emergency call via the NENA event logging protocol and displays the emergency call information on the graphical map displays of one or more operator positions associated with the determined PSAP.

2. The method of claim 1 wherein the selection of the emergency call from the graphical map display further comprises communicating, via a call control interface to a responder client, a call identifier associated with the selected emergency call.

3. The method of claim 2 wherein receiving the selection of the selected emergency call comprises the responder client requesting to the ESP to transfer the emergency call to the one of the one or more secondary responder agencies based on the call identifier associated with the emergency call.

4. The method of claim 3 wherein the ESP routes the emergency call to the one of the one or more secondary responder agencies and updates status information associated with the emergency call to the map server.

5. The method of claim 4 wherein the graphical map display provides a geographical map and identifies a plurality of emergency calls, wherein a particular emergency call can be selected and identified to an operator position.

6. The method of claim 1 wherein one or more emergency calls are associated with an incident identifier.

7. The method of claim 6 wherein an incident having more than one associated emergency call has at least one common identification characteristic on the graphical map display based upon the incident identifier.

8. The method of claim 1 wherein the ESP is associated with multiple public safety access points (PSAP), each PSAP associated with one or more operator positions wherein the ESP determines the PSAP assigned to the received emergency call and routes the call to the determined PSAP.

9. The method of claim 8 wherein the ESP routes the emergency call to the determined PSAP based upon one or more of: the location information associated with the emergency call, an incoming network, an incoming trunk, communications protocol, and an originating identification number.

10. The method of claim 1 wherein the location information is provided by automatic location information or radio resource location services protocol (LCS protocol).

11. The method of claim 1 wherein the call is transferred to an operator position when the emergency call is selected.

12. The method of claim 1 wherein determining the one or more secondary responder agencies for the selected emergency call further comprises querying an emergency call routing function to determine the one or more secondary responder agencies.

13. The method of claim 1 wherein the secondary responder agencies are selected from the group comprising:
   a police service;
   a fire service; and
   an emergency medical service.

14. A system of emergency call management, the system comprising:
   an emergency service platform (ESP) interfacing to one or more communications networks for receiving emergency calls originating from the one or more communications networks;
   a map server for receiving location information from the ESP associated with the receive emergency calls; and
   a public safety access point (PSAP) coupled to the ESP and map server, the PSAP comprising one or more operator positions;
      each operator position comprising:
         a graphical map display for receiving mapping data from the map server and receiving a selection of an emergency call on the display and one or more secondary responder agencies; and
         a responder client coupled to the graphical map display for receiving identification of the selected emergency call and for requesting from the ESP that the emergency call be directed to one of the one or more secondary responder agencies;
      wherein the map server receives identification of the PSAP associated with the emergency call via the NENA event logging protocol and displays the emergency call information on the graphical map displays of the operator positions associated with the determined PSAP.

15. The system of claim 14 wherein displaying the location information comprises providing location information from the ESP to the map server by a National Emergency Number Association (NENA) event logging protocol to provide location and status information associated with the emergency call, the map server providing mapping data to the graphical map display of each operator position based upon the received location information.

16. The system of claim 15 wherein the selection of the emergency call from the graphical map display further comprises communicating, via a call control interface to the responder client, a call identifier associated with the selected emergency call.

17. The system of claim 16 wherein receiving the selection of the selected emergency call comprises the operator position requesting the ESP transfer the emergency call with the call identifier associated with the emergency call.

18. The system of claim 17 wherein the ESP routes the emergency call to the selected one of the one or more secondary responder agencies and updates status information associated with the emergency call to the map server.

19. The system of claim 14 wherein the graphical map display provides a geographical map and identifies a plurality of emergency calls wherein a particular emergency call can be selected and identified to the operator position.

20. The system of claim 14 wherein the ESP is associated with multiple PSAPs, each PSAP associated with one or more operator positions, wherein the ESP determines the PSAP associated with a received emergency call and routes to the determined PSAP.

21. The system of claim 20 wherein the ESP routes the emergency call to the determined PSAP based upon one or more of: the location information associated with the call, an incoming network, an incoming trunk, communication protocol, and an originating identification number.

22. The system of claim 14 wherein the call is transferred to the operator position when the emergency call is selected.

23. The system of claim 14 wherein the emergency service platform transfers the emergency call to an operator position using a session initiated protocol (SIP).

24. The system of claim 14 wherein the emergency service platform queries an emergency call routing function to determine the one or more secondary responder agencies.

25. The system of claim 14 wherein the secondary responder agencies are selected from the group comprising:
a police service;
a fire service; and
an emergency medical service.

26. A non-transitory computer readable memory containing instruction for emergency call management, the instructions when executed by a processor performing the method comprising:
receiving an emergency call at an emergency service platform (ESP) providing an interface to one or more communication networks;
receiving location information associated with the emergency call;
identifying the location of the emergency call on a graphical map display by providing location information from the ESP to a map server by a National Emergency Number Association (NENA) event logging protocol to provide location and status information associated with the emergency call, the map server providing mapping data to the graphical map display based upon the received location information;
receiving a selection of the emergency call from a plurality of emergency calls displayed on the graphical map display;
determining one or more secondary responder agencies for the selected emergency call;
receiving a selection of a secondary responder agency from the one or more secondary responder agencies; and
initiating a transfer of the selected emergency call to one of the one or more secondary responder agencies;
wherein the map server receives identification of the PSAP associated with the emergency call via the NENA event logging protocol and displays the emergency call information on the graphical map displays of the operator positions associated with the determined PSAP.

* * * * *